US008709122B2

(12) United States Patent
Lee et al.

(10) Patent No.: US 8,709,122 B2
(45) Date of Patent: *Apr. 29, 2014

(54) BIOCHAR PRODUCTION METHOD AND COMPOSITION THEREFROM

(71) Applicant: UT-Battelle, LLC, Oak Ridge, TN (US)

(72) Inventors: James W. Lee, Cockeysville, MD (US); Archibald C. Buchanan, III, Knoxville, TN (US); Barbara R. Evans, Oak Ridge, TN (US); Michelle K. Kidder, Clinton, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/778,291

(22) Filed: Feb. 27, 2013

(65) Prior Publication Data

US 2013/0233038 A1    Sep. 12, 2013

Related U.S. Application Data

(63) Continuation of application No. 12/686,831, filed on Jan. 13, 2010, now Pat. No. 8,398,738.

(51) Int. Cl.
| | |
|---|---|
| *C05C 11/00* | (2006.01) |
| *C01B 31/16* | (2006.01) |
| *C05D 9/00* | (2006.01) |
| *C05F 7/00* | (2006.01) |

(52) U.S. Cl.
USPC ........... 71/54; 47/58.1 SC; 71/24; 71/903; 423/447.1; 423/447.2; 423/447.7; 502/418; 502/433; 502/437

(58) Field of Classification Search
USPC .............. 71/11–26, 54, 903; 47/58.1 SC; 423/447.1, 447.2, 447.7; 502/418, 433, 502/437

See application file for complete search history.

(56) References Cited

U.S. PATENT DOCUMENTS

| | | | |
|---|---|---|---|
| 6,447,437 B1 | 9/2002 | Lee et al. | |
| 8,398,738 B2 * | 3/2013 | Lee et al. | 71/54 |
| 2004/0111968 A1 | 6/2004 | Day et al. | |
| 2008/0300131 A1 | 12/2008 | Bandosz | |
| 2009/0031616 A1 | 2/2009 | Agblevor | |
| 2009/0126433 A1 | 5/2009 | Piskorz et al. | |
| 2010/0257775 A1 | 10/2010 | Cheiky | |
| 2011/0172092 A1 | 7/2011 | Lee et al. | |

OTHER PUBLICATIONS

Schneider M.P.W. et al., "The Benzene Polycarboxylic Acid (BPCA) Pattern of Wood Pyrolyzed Between 200 C and 1000 C", *Organic Geochemistry* 41(10):1082-1088 (Abstract only) (2010).

Keiluweit M. et al., "Dynamic Molecular Structure of Plant Biomass-Derived Black Carbon", *Environmental Science & Technology* 44(4):1247-1253 (Abstract only) (2010).

(Continued)

*Primary Examiner* — Wayne Langel

(74) *Attorney, Agent, or Firm* — Scully, Scott, Murphy & Presser, P.C.

(57) ABSTRACT

The invention is directed to a method for producing an oxygenated biochar material possessing a cation-exchanging property, wherein a biochar source is reacted with one or more oxygenating compounds in such a manner that the biochar source homogeneously acquires oxygen-containing cation-exchanging groups in an incomplete combustion process. The invention is also directed to oxygenated biochar compositions and soil formulations containing the oxygenated biochar material.

30 Claims, 29 Drawing Sheets

(56) References Cited

OTHER PUBLICATIONS

Chen B. et al., "Sorption of Naphthalene and 1-Naphthol by Biochars of Orange Peels With Different Pyrolytic Temperatures", *Chemosphere* 76:127-133 (2009).

Abdullah H. et al., "Biochar as a Fuel: 1. Properties and Grindability of Biochars Produced from the Pyrolysis of Mallee Wood Under Slow-Heating Conditions", *Energy & Fuels* 23:4174-4181 (2009).

Chen B. et al., "Transitional Adsorption and Partition of Nonpolar and Polar Aromatic Contaminants by Biochars of Pine Needles With Different Pyrolytic Temperatures", *Environmental Science and Technology* 42:5137-5143 (2008).

Skjemstad J.O. et al., "Measurement of Cation Exchange Capacity of Organic-Matter Fractions from Soils Using a Modified Compulsive Exchange Method", *Communications in Soil Science and Plant Analysis* 39(5-6):926-937 (2008).

Spedding V., "Ancient Soil Methods Impress Modern Science and Help Climate", *Environmental Research Letters* (Jan. 15, 2008).

Warnock D.D. et al., "Mycorrhizal Responses to Biochar in Soil-Concepts and Mechanisms", *Plant Soil* 300:9-20 (2007).

Liang B. et al., "Black Carbon Increases Cation Exchange Capacity in Soils", *Soil Science Society of America Journal* 70(5):1719-1730 (2006).

Post W.M. et al., "Enhancement of Carbon Sequestration in US Soils", *BioScience* 54(10):895-908 (2004).

Özçimen D. et al., "Production and Characterization of Bio-Oil and Biochar from Rapeseed Cake", *Renewable Energy* 29:779-787 (2004).

Lehman J. et al., "Nutrient Availability and Leaching in an Archaeological Anthrosol and a Ferralsol of the Central Amazon Basin: Fertilizer, Manure and Charcoal Amendments", *Plant and Soil* 249:343-357 (2003).

Kane R.L. et al., "Carbon Sequestration", *Chemical Engineering Progress*, pp. 97-112 (2001).

Waymack B.E. et al., "Effect of Additives on Aromatic Hydrocarbon Evolution from Biomass Char", *Preprints of Symposia-American Chemical Society, Division of Fuel Chemistry* 46(1):198-200 (Abstract only) (2001).

Brunow G. et al., "The Chemical Structure of Extracellular Lignin Released by Cultures of *Picea abies*", *Phytochemistry* 32(4):845-850 (1993).

International Search Report and Written Opinion dated Nov. 1, 2011 received from the Korean Intellectual Property Office from related International Application PCT/US2011/020306.

\* cited by examiner

G1 IPA

G1 Water

G1 IPA

G1 Water

G2 Water

G2 IPA

BIOCHAR PRODUCTION METHOD AND COMPOSITION THEREFROM

CROSS REFERENCE TO RELATED APPLICATIONS

This application is a continuation of U.S. application Ser. No. 12/686,831 filed on Jan. 13, 2010, the contents of which are incorporated herein by reference in their entirety.

This invention was made with government support under Contract Number DE-AC05-00OR22725 between the United States Department of Energy and UT-Battelle, LLC. The U.S. government has certain rights in this invention.

FIELD OF THE INVENTION

The present invention relates generally to methods for sequestering carbon dioxide in soils and fertilizing soils, and more particularly, to the use of biochar for these purposes.

BACKGROUND OF THE INVENTION

Photosynthesis captures more carbon dioxide ($CO_2$) from the atmosphere than any other process on Earth. Each year, land-based green plants capture about 403 gigatons (Gt) of $CO_2$ (equivalent to 110 Gt $C_y^{-1}$) from the atmosphere into biomass. However, since biomass is not a stable form of carbon material, a substantial portion of the biomass decomposes in a relatively short time to $CO_2$. As a result, increased biomass production (i.e., by increased tree growth) is of limited utility for carbon sequestration since the resulting biomass soon returns the absorbed $CO_2$.

Unlike untreated biomass, carbonized biomass (i.e., charcoal or "biochar") contains carbon in a highly stabilized state, i.e., as elemental carbon. The inertness of elemental carbon results in its very slow decomposition to $CO_2$. Typically, at least several hundreds of years are necessary for the complete decomposition of biochar to $CO_2$. As a result, there is great interest in producing biochar as a means for mitigating atmospheric $CO_2$ production. There is particular interest in incorporating produced biochar into soil (i.e., as a soil amendment) where the biochar functions both as a $CO_2$ sequestrant and as a soil amendment.

Biochar production and incorporation into soil has been practiced since ancient times. Of particular relevance is the recent discovery of biochar particles in soils formed by pre-Columbian indigenous agriculturalists in Amazonia, i.e., so-called "Terra Preta" soil. See, for example, B. Liang, et al., *Soil Science Society of America Journal*, vol. 70 (5), September-October (2006).

The capacity of carbon sequestration by application of biochar fertilizer is estimated to be quite significant. The amount of biochar materials that could be placed into soil could be as high as 10% by weight of the soil. Accordingly, in the first 30-cm layer of U.S. cropland soil alone, 40 Gt of carbon could be sequestered in the form of biochar particles. The worldwide capacity for storing biochar carbon in agricultural soils could exceed 400 Gt of carbon. A conversion as low as 8% of the annual terrestrial photosynthetic products (110 Gt C $y^{-1}$) into stable biochar material would be sufficient to offset the entire amount (nearly 8 Gt C $y^{-1}$) of $CO_2$ emitted into the atmosphere annually from the use of fossil fuels.

Significant amounts of biochar are currently being produced as a byproduct in biomass-to-biofuel production processes. The most common biomass-to-biofuel production processes include low temperature and high temperature pyrolysis (i.e., gasification) processes. Pyrolysis operations generally entail combusting biomass in the substantial absence of oxygen. Biofuels commonly produced in low temperature pyrolysis operations include hydrogen, methane, and ethanol. Gasification processes are generally useful for producing syngas (i.e., $H_2$ and CO).

An important property of biochar is its cation-exchanging ability. The cation-exchanging ability or lack thereof of a biochar is evident by the magnitude of its cation exchange capacity (CEC). It is known that biochar with, in particular, an increased cation exchange capacity generally possesses a greater nutrient retention capability. Biochars with greater cation exchange capacity generally possess a significant amount of hydrophilic oxygen-containing groups, such as phenolic and carboxylic groups, which impart the greater cation exchange ability (Liang et al., 2006, Ibid.).

The CEC is defined as the amount of exchangeable cations (e.g., $K^+$, $Na^+$, $NH_4^+$, $Mg^{2+}$, $ca^{2+}$, $Fe^{3+}$, $Al^{3+}$, $Ni^{2+}$, and $Zn^{2+}$) bound to a sample of soil. CEC is often expressed as centimoles (cmol) or millimoles (mmol) of total or specific cations per kilogram (kg) of soil. A substantial lack of a cation-exchanging property is generally considered to be reflected in a CEC of less than 50 mmol/kg. A moderate CEC is typically considered to be within the range of above 50 and at or less than 250 mmol/kg. An atypically or exceptionally high CEC would be at least 250 mmol/kg.

Though biochar is generally useful for $CO_2$ sequestration, the types of biochar found in ancient soils or produced as an industrial byproduct are highly variable in their physical and property characteristics, e.g., chemical composition, porosity, charge density, and CEC. One of the most common production processes of biochar is the practice since ancient times of burning biomass in open pits. Such uncontrolled processes generally produce significant quantities of oxide gases of combustion, such as $CO_2$ and CO, generally in amounts significantly greater than 20 percent by weight of the carbon content of the biochar source. In addition, the resulting biochar is highly non-uniform in composition, e.g., substantially non-oxygenated portions particularly in the interior portions of the biochar pit and moderately oxygenated portions at the outer peripheral portions of the biochar pit. Furthermore, the uncontrolled process generally results in significant batch-to-batch variability. Moreover, by the uncontrolled process, the characteristics of the resulting biochar are generally unpredictable and not capable of being adjusted or optimized.

Though biochar materials possessing moderate cation exchange capacities are known, such biochar compositions are not typical, and moreover, are found sporadically and in unpredictable locations of the world. Therefore, there is a need in the art for a method for manufacturing oxygenated biochar compositions having at least a moderate cation exchange capacity so that such biochar compositions are more readily available. There is an additional need for such a method to produce oxygenated biochar compositions having an atypically high cation exchange capacity, and more preferably, a cation exchange capacity significantly higher than found in known soil deposits. Such biochar materials would have the advantage of more effectively retaining soil nutrients, and thus, functioning as superior fertilizing/soil amending materials while aiding in carbon sequestration.

There is an additional need for a method for producing oxygenated biochar wherein the biochar is reproducibly manufactured with low batch-to-batch variation in one or more characteristics of the biochar (e.g., cation exchange capacity, particle size, porosity, C:O ratio, and the like). There is a further need for a method for producing oxygenated biochar wherein the biochar is substantially uniform in one or more characteristics, such as oxygen-to-carbon ratio, CEC, and chemical composition. A further need exists wherein such a method can be appropriately adjusted, modified, or optimized in order to effect a corresponding modification, adjustment, or optimization in one or more biochar properties.

SUMMARY OF THE INVENTION

In one aspect, the invention is directed to a method for producing an oxygenated biochar material possessing a cation-exchanging property. The method generally entails reacting a biochar source with one or more oxygen-containing reactive compounds in such a manner that the biochar source homogeneously (i.e., uniformly) acquires oxygen-containing cation-exchanging groups in an incomplete combustion process. The method includes any process that oxygenates biochar materials to increase their cation exchange capacity.

In another aspect, the invention is directed to an oxygenated biochar. In a particular embodiment, the oxygenated biochar possesses an exceptionally high cation exchange capacity, i.e., higher than found in biochars of known soil deposits or as generally available. The oxygenated biochar can be produced by any suitable method, such as the methods described herein. In a further aspect, the invention is directed to a soil formulation containing the oxygenated biochar.

The method described herein advantageously makes more readily available in essentially unlimited supply biochar possessing at least a moderate cation exchange capacity as may be found sporadically and in scarce supply in selected locations of the world. The method also advantageously provides oxygenated biochar compositions that are currently sought but not available, e.g., those having specialized or optimized properties, such as those having a cation exchange capacity exceptionally higher than other known biochars. The method is also capable of producing bulk quantities (e.g., from pounds to tons) of such biochar materials, and particularly, biochar materials having CEC values significantly higher than currently known.

The method is also capable of producing oxygenated biochar materials having a precisely tailored set of characteristics (e.g., a particular CEC value or range, and/or surface area, and/or charge density, and/or particle size, and/or chemical composition). The method described herein is also advantageously capable of being appropriately adjusted, modified, or optimized in order to effect a corresponding modification, adjustment, or optimization in one or more biochar properties. The method described herein is also advantageously capable of producing an oxygenated biochar that is uniform in one or more characteristics. The method described herein is also advantageously capable of producing such a biochar in a reproducible manner, i.e., with low batch-to-batch variation in one or more characteristics of the biochar (e.g., cation exchange capacity, particle size, porosity, C:O ratio, and the like), as contrasted with the wide compositional variations found across different biochar deposits.

The ready and unlimited supply of such improved biochar compositions provides the significant benefit of furthering carbon sequestration by producing and using such biochar compositions in large quantities, while at the same time greatly enhancing the fertilization of soils. The enhanced fertilization of soils would, in turn, provide several benefits, including more efficient and less costly farming.

DETAILED DESCRIPTION OF THE INVENTION

Figure 1:
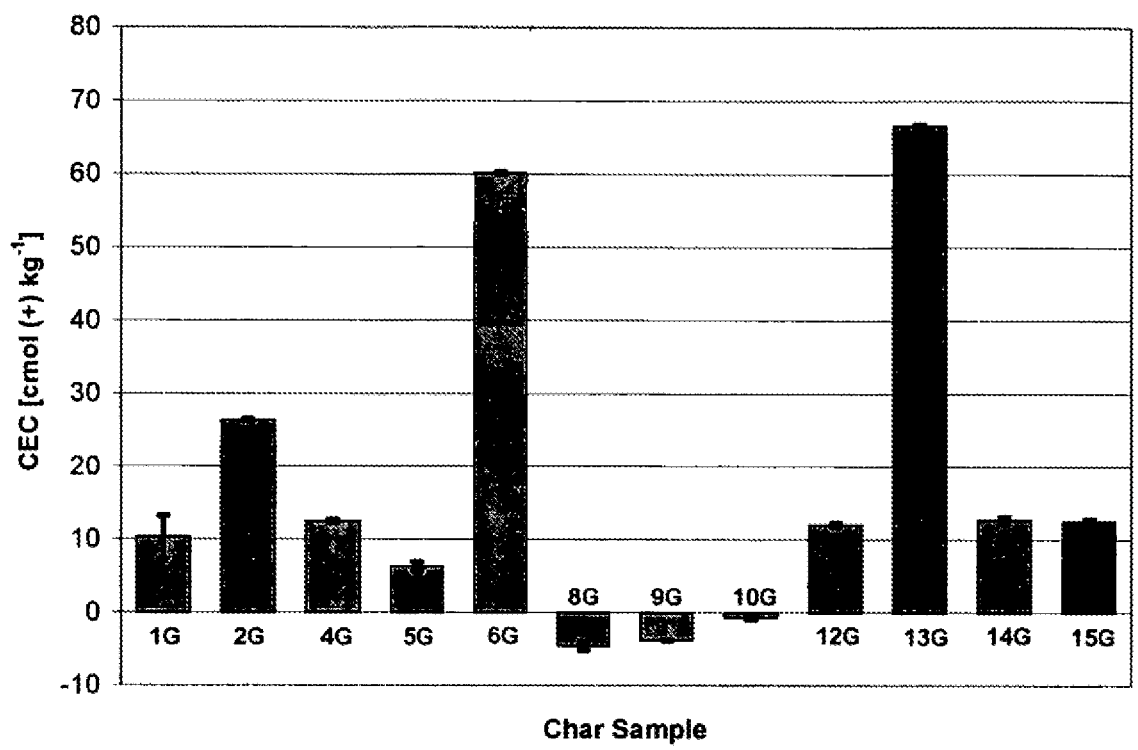
FIG. 1. Chart showing comparison of cation exchange capacities for several biochar samples prepared according to methods of the invention.

In a first aspect, the invention is directed to a method for producing an oxygenated biochar material possessing a cation-exchanging property. The cation-exchanging ability of a biochar is known to be predominantly dependent on the density of cation-exchanging groups present in the biochar. The cation-exchanging groups are generally oxygen-containing chemical groups, such as hydroxy (—OH) and carboxy (—COOH) groups.

In the method, a biochar source is reacted with one or more oxygenating compounds in a controlled manner such that the biochar source homogeneously acquires oxygen-containing cation-exchanging groups in an incomplete combustion process. By being an "incomplete combustion process" is meant that a significant portion of the total carbon content in the biochar source remains (i.e., is not converted to oxide gases of combustion) after the oxygenation method described herein is completed. Oxide gases of combustion typically include, for example, $CO_2$ and CO. Preferably, no more than about 20 percent by weight of the carbon contained in the biochar source is converted to one or more oxide gases of combustions. More preferably, no more than about 10, 5, 2, or 1 percent by weight of the carbon contained in the biochar source is converted to one or more oxide gases of combustion. In a particular embodiment, the inventive method is conducted as a combustionless process, i.e., such that substantially none (e.g., less than 0.5 or 0.1 percent by weight) of the carbon content of the biochar source is converted to oxide gases of combustion.

In contrast to the highly uncontrolled combustion processes known in the art, the method described herein is a highly controlled oxygenation process that results in the partial oxidation (i.e., partial oxygenation) of biochar material such that a biochar with a cation exchange property is produced while advantageously emitting much lower amounts of oxide gases of combustion. Moreover, due in large part to the controlled nature of the oxygenation process, the method described herein generally produces a substantially uniform (i.e., substantially homogeneous) oxygenated biochar. By being "substantially uniform" is generally meant, at minimum, that there is an absence in the oxygenated biochar of regions of non-oxygenated biochar (as commonly found in biochar material formed under uncontrolled conditions, such as in open pits). Preferably, a substantially uniform oxygenated biochar possesses different macroscopic regions (e.g., of at least 100 μm$^2$, 1 mm$^2$, 10 mm$^2$, or 1 cm$^2$ in size) that vary by no more than 10%, 5%, 2%, 1%, 0.5%, or 0.1% in at least one characteristic, such as CEC, oxygen to carbon ratio, and/or surface area. The substantial uniformity of the oxygenated biochar advantageously provides a user with a biochar material that provides a consistent result when distributed into soil, either packaged or in the ground. Furthermore, a substantial uniformity of the oxygenated biochar ensures that a tested characteristic of the biochar is indicative of the entire batch of biochar.

In the method, a substantially uniform biochar is attained by an effective level of mixing of the biochar during the oxygenation process. For example, in one embodiment, biochar is agitated, shaken, or stirred either manually or mechanically during the oxygenation process. In another embodiment, the biochar is reacted in an open or closed container (e.g., a kiln) containing a tumbling mechanism such that the biochar is tumbled during the oxygenation reaction.

The biochar source considered herein can be any biochar material that could benefit by the oxygenation process of the inventive method. The biochar source could be, for example, a byproduct of a pyrolysis or gasification process, or material acquired from a biochar deposit. Generally, the biochar is plant-derived (i.e., derived from cellulosic biomass or vegetation). Some particular examples of biomass materials considered herein from which the biochar can be derived include, for example, cornstover (e.g., the leaves, husks, stalks, or cobs of corn plants), grasses (e.g., switchgrass, miscanthus, wheat straw, rice straw, barley straw, alfalfa, bamboo, hemp), sugarcane, hull or shell material (e.g., peanut, rice, and walnut hulls), woodchips, saw dust, paper or wood pulp, food waste, agricultural waste, and forest waste. In one embodiment, the biomass material is in its native form, i.e., unmodified except for natural degradation processes, before being converted to biochar. In another embodiment, the biomass material is modified by, for example, adulteration with a non-biomass material (e.g., plastic- or rubber-based materials) or by physical modification (e.g., mashing, grinding, compacting, blending, heating, steaming, bleaching, nitrogenating, oxygenating, or sulfurating), before being converted to biochar.

The one or more oxygenating compounds considered herein are any compounds or materials known in the art that tend to be reactive by imparting oxygen atoms into organic materials. Most notable in this regard is oxygen gas, or more typically, oxygen in the form of air. The oxygen gas may also be in the form of an artificial gas mixture, such as an oxygen-nitrogen, oxygen-argon, oxygen-helium, or oxygen-carbon dioxide mixture. An artificial gas mixture can be advantageous for the purposes of the invention in that the level of oxygen can be precisely controlled, thereby further controlling the reaction to prevent combustion and optimize the density and kind of oxygen-containing groups in the biochar. For example, in different embodiments, it may be preferred to use an oxygen-containing gas mixture having at least, less than, or about, for example, 0.1%, 0.5%, 1%, 5%, 10%, 20%, 30%, 40%, 50%, 60%, 70%, 75%, 80%, 85%, 90%, 95%, 97%, 98%, or 99% by weight or volume of oxygen, or a range bounded by any two of the foregoing values. In another embodiment, a substantially pure source of oxygen gas is used, i.e., greater than 99% of oxygen. Some examples of other oxygenating compounds include the hypohalites (e.g., a hypochlorite salt, such as NaOCl), the halites (e.g., a chlorite or bromite salt, such as $NaO_2Cl$ or $NaO_2Br$), the halates (e.g., a chlorate or bromate salt, such as $NaO_3Cl$ or $NaO_3Br$), the perhalates (e.g., a perchlorate, perbromate, or periodate salt, such as $NaO_4Cl$, $NaO_4Br$, or $NaO_4I$), the halogen-oxygen compounds (e.g., $ClO_2$), the peroxides (e.g., $H_2O_2$ and urea peroxide), superoxides (e.g., $NaO_2$ and $KO_2$), ozone, pyrosulfates (e.g., $NaS_2O_7$), peroxodisulfates (e.g., $Na_2S_2O_7$, $K_2S_2O_7$, and $(NH_4)_2S_2O_7$), percarboxylic acids (e.g., peracetic acid), percarbonates, and permanganates (e.g., $K_2MnO_4$). Alternatively, the oxygenating compounds can be two or more chemicals that react with each other to form oxygen gas in situ (e.g., a permanganate salt or hypohalite combined with hydrogen peroxide).

In one embodiment, the inventive method is practiced by treating the biochar source with an oxygen plasma. Any of the oxygen plasma processes known in the art, including high and low temperature plasma processes, are considered herein. The introduction of oxygen into the biochar materials by an oxygen plasma treatment increases the O:C ratios of these materials. The cation exchange capacity increases with the O:C ratio of the biochar materials. The method includes oxygen plasma treatment as a treatment that improves cation exchange capacity by enhanced "partial oxygenation" of the biochar materials.

Preferably, the oxygen plasma is a low temperature plasma (e.g., 15 to 30° C.) as commonly used in the art for surface modification and cleaning. Generally, the plasma process entails subjecting the biochar at reduced pressure (i.e., in a vacuum chamber) to a source of ionized oxygen or oxygen radicals. The ionized source of oxygen is typically produced by exposing oxygen at a reduced pressure of about 0.05 to 2 Ton to an ionizing source, such as an ionizing microwave, radiofrequency, or current source. Commonly, a radiofrequency source (e.g., of 13.56 MHz at a RF power of about 10-100 W) is used to ionize the oxygen. The particular oxygen plasma conditions depend on several factors including the type of plasma generator, gas composition, power source capability and characteristics, operating pressure and temperature, the degree of oxygenation required, and characteristics of the particular biochar being treated (i.e., its susceptibility or resistance to oxygenation). Depending on several factors including those mentioned above, the biochar is typically exposed to the ionized oxygen for at least about 0.1, 0.2, 0.5, 1, 1.5, 2, 2.5, 3, 4, or 5 minutes and up to 6, 8, 10, 12, 15, 20, 30, 40, 50, or 60 minutes. Though the biochar is typically plasma treated within a temperature range of about 15 to 30° C., a lower temperature (e.g., less than 15° C.) or a higher temperature (e.g., greater than 30° C., such as 40° C., 50° C., 60° C., 70° C., 80° C., 90° C., or 100° C.) may be used. Generally, an oxygen plasma process is conducted as a combustionless process, i.e., without producing oxide gases of combustion.

In another embodiment, the method is practiced by treating a biochar source with one or more oxygenating compounds (typically, oxygen in the form of air) at a temperature at which the oxygenating compound is reactive enough to impart oxygen-containing cation-exchanging groups to the biomass, i.e., at a suitably reactive temperature, wherein the amount of the oxygenating compound and/or time of reaction is appropriately adjusted such that the biochar acquires the cation-exchanging groups in an incomplete combustion process. In a particular embodiment, the reaction is conducted as a combustionless process. Highly reactive oxygenating compounds can typically function effectively at room temperature (e.g., 15 to 30° C.) or even lower temperatures (e.g., less than 15° C.). Moderately reactive oxygenating compounds (e.g., oxygen) can typically function effectively at a temperature of at least 100, 150, 200, 250, 300, 350, 400, 450, 500, 550, 600, 650, 700, 750, 800, 850, 900 or 950° C., or within a range bounded by any two of these values. It is understood that longer reaction times generally yield a more oxygenated biochar whereas shorter reaction times generally yield a less oxygenated biochar. Therefore, it is also understood that a moderately reactive or substantially unreactive oxygenating compound may effectively oxygenate biochar by use of a temperature of or less than 100° C. if a sufficient period of time is used, e.g., about or at least 12 hours, 24 hours, 36 hours, 48 hours, 72 hours, a week, two weeks, three weeks, a month, two months, or three months.

In one embodiment, an incomplete combustion process is attained by limiting the amount of oxygenating compound to an amount less than the amount required for complete combustion of the biochar source. A permissible amount of oxygenating compound (i.e., less than required for complete combustion) can be found by knowing the amount of carbon contained in the biochar source, and from this, calculating an amount of oxygenating compound less than required for complete combustion. The amount of carbon contained in the biochar sample can be determined by either an accurate measurement (e.g., by elemental analysis) or by an approximation (e.g., by weighing, and assuming nearly all of the weight to be from carbon). The amount of oxygenating compound is preferably no more than about 30%, 25%, or 20% of the moles of oxygenating compound required for complete combustion of the biochar. More preferably, the amount of oxygenating compound is no more than about 15%, 10%, 5%, 4%, 3%, 2%, 1%, 0.5%, 0.2%, or 0.1% of the moles of oxygenating compound required for complete combustion of the biochar.

In a particular embodiment, the oxygenating compound is reacted with biochar in a closed system (i.e., closed container) in order to ensure that the intended amount of oxygenating compound as measured, and no less and no more, is reacted with the biochar. When an oxygenating solid or liquid oxygenating compound (or a solution thereof) is used, the solid or liquid can be weighed into the closed container along with the biochar source and the contents homogeneously mixed or blended under conditions suitable for oxygenation of the biochar to take place. For example, the temperature of the mixed reactants in the container can be raised along with proper agitation until the solid or liquid becomes suitably vaporized in order to promote its reaction with the biochar in a uniform (i.e., homogeneous) manner. When an oxygenating gas (e.g., oxygen) is used, a selected volume of the gas corresponding to a calculated weight or moles of the gas can be charged into the closed system along with the biochar source before raising the temperature for more efficient oxygenation of the biochar. Alternatively, the process is simplified by the use of air wherein the closed container containing an amount of biochar is first opened to cause the container to fill with air, and then closed before proceeding with the heating process, thereby resulting in a limited amount of air.

Particularly when air or artificial oxygen-gas mixture is used, the reactants are typically placed in a heatable closed system (i.e., a thermally-insulated chamber), such as an oven, kiln, or furnace. The heatable closed system can be any such systems known in the art typically operated or assisted by, for example, a flame (e.g., from a natural gas source), electricity, or microwaves. The kiln can be, for example, any of the downdraft, updraft, cross draft, fluid bed, or rotating kilns known in the art. The heatable closed system can also be one configured to adjust the moisture level of the biochar, i.e., either to decrease or increase the moisture level of the biochar. The moisture level can be suitably adjusted, for example, to a humidity level of about, at least, or no more than 1%, 2%, 5%, 10%, 15, 20%, 25%, 30%, 35%, 40%, 45%, 50%, 55%, 60%, 65%, 70%, 75%, 80%, 85%, 90%, 95%, or 100%, or a humidity level within a range bounded by any two of these values. In different embodiments, the reactants can be heated in the closed chamber to a temperature of 100° C., 150° C., 200° C., 250° C., 300° C., 350° C., 400° C., 450° C., 500° C., or 550° C., or a temperature within a range bounded by any two of the foregoing temperatures. In a particular embodiment, heating can advantageously be minimized or altogether dispensed with by reacting still hot biochar (i.e., as rendered hot by a biomass-to-biochar production process) under the oxygenating conditions of the invention. The still hot biochar preferably possesses a temperature of at least 450° C., 400° C., 350° C., 300° C., 250° C., or within a range bounded by any two of these values.

In one embodiment, the biochar and one or more oxygenating reactants are reacted for a period of time necessary for substantially all of the oxygenating reactant in a closed container to be consumed. In another embodiment, conditions of temperature and/or time are selected such that a portion of the oxygenating reactant in a closed container is consumed.

In another particular embodiment, an incomplete combustion process is attained by conducting the oxygenation reaction in an open or closed container and rapidly quenching the reaction. The reaction can be quenched by, for example, contacting the reacting biochar with an excessive amount of water and/or an inert substance, preferably when the biochar material is still hot, e.g., a temperature of at least 450° C., 400° C., 350° C., 300° C., 250° C., 200° C., 150° C., or within a range bounded by any two of these values, as produced from a biomass-to-biochar process. The inert substance can be, for example, carbon dioxide or a form of biomass (e.g., soil, plant-material, or the like). An excessive amount of water and/or inert substance is an amount that preferably covers all of the reacting biochar, or alternatively, functions as a bulk surface shield of the biochar, with the result that the oxygenating process (including a combustion process, if occurring) is immediately halted due to restricted access of the oxygenating compound to the biochar. If an elevated temperature is being used in the oxygenation process, the quenching step also typically has the effect of rapidly reducing the temperature of the biochar. A quenching step can alternatively be practiced by rapid sealing of an open container in which air-combustion of biochar is taking place.

The method described herein can also include one or more preliminary steps for producing biochar (i.e., the biochar source or "produced biochar") from biomass before the biochar is oxygenated. The biomass-to-biochar process can be conducted within any suitable time frame before the produced biochar is oxygenated.

In one embodiment, a biomass-to-biochar process is conducted in a non-integrated manner with the biochar oxygenation process. In the non-integrated process, biochar produced by a biomass-to-biochar process is transported to a separate location where the biochar oxygenation process is conducted. The transport process generally results in the cooling of the biochar to ambient temperature conditions (e.g., 15-30° C.) before oxygenation occurs. Typically, the produced biochar is packaged and/or stored in the non-integrated process before oxygenation of the biochar.

In another embodiment, a biomass-to-biochar process is conducted in an integrated manner with a biochar oxygenation process. In the integrated process, biochar produced by a biomass-to-biochar process is oxygenated in situ without first being cooled to ambient temperature. For example, in the integrated embodiment, freshly produced biochar can have a temperature of, for example, about or at least 450° C., 400° C., 350° C., 300° C., 250° C., 200° C., 150° C., 100° C., or 50° C., or a temperature within a range bounded by any two of these values, before being subjected to the oxygenation process. If desired, the freshly produced biochar can be subjected to additional heating to elevate and/or maintain its temperature before the oxygenation step.

The biochar oxygenation process can be integrated with, for example, a biomass-to-fuel process, such as a low temperature or high temperature pyrolysis process. In such processes, typically about 40%, 50%, or 60% of the biomass carbon is converted into biochar while the remaining 60%, 50%, or 40% of carbon is converted to fuel (e.g., $H_2$ and/or bio-oils). Furthermore, since it has been found that lower temperature pyrolysis processes generally yield a biochar material with even more improved fertilizer retention properties, in a particular embodiment, the biochar oxygenation process is integrated with a biomass pyrolysis process conducted at a temperature of no more than about 450° C., 400° C., or 350° C.

In one embodiment, an integrated process is configured as a batch process wherein separate batches of produced biochar are oxygenated at different times. In another embodiment, the integrated process is configured as a continuous process wherein biochar produced by the biomass-to-biochar process is continuously subjected to an oxygenation process as it is produced. For example, produced biochar can be continuously transported either manually or by an automated conveyor mechanism through a biochar oxygenation zone. The automated conveyor mechanism can be, for example, a conveyor belt, gravity-fed mechanism, or air pressure mechanism.

In another aspect, the invention is directed to an oxygenated biochar having a particular, exceptional, or optimal set of characteristics, such as a particular, exceptional, or optimal oxygen-to-carbon molar ratio, CEC, surface area, composition, and/or uniformity in any of these or other characteristics. The method described above is particularly suitable for producing these types of biochars.

In one embodiment, the CEC of the oxygenated biochar is at least moderate, e.g., about or at least 50, 60, 70, 80, 90, 100, 110, 120, 130, 140, 150, 160, 170, 180, 190, 200, 210, 220, 230, or 240 mmol/kg, or within a particular range bounded by any two of the foregoing values. In another embodiment, the CEC of the oxygenated biochar is atypically or exceptionally high, e.g., about or at least 250, 300, 350, 400, 450, 500, 550, 600, 650, 700, 750, 800, or 850 mmol/kg, or within a particular range bounded by any two of the foregoing values. In another embodiment, the CEC of the oxygenated biochar is within a range having a minimum value selected from any of the exemplary moderate CEC values given above and a maximum value selected from any of the exemplary atypically high CEC values given above (for example, 50-850 mmol/kg or 200-850 mmol/kg). Preferably, the CEC value is substantially uniform throughout the biochar material.

The density of oxygen-containing cation-exchanging groups is typically proportional to the measured oxygen-to-carbon molar ratio of the biochar, wherein the higher the oxygen-to-carbon molar ratio, the greater the density of cation-exchanging groups in the biochar. In different embodiments, the oxygen-to-carbon molar ratio of the oxygenated biochar is preferably adjusted to be about or at least 0.1:1, 0.2:1, 0.25:1, 0.3:1, 0.35:1, 0.4:1, or within a range bounded by any two of the foregoing ratios. Preferably, the oxygenated biochar contains a substantially uniform density of the oxygen-containing cation-exchanging groups and a substantially uniform oxygen-to-carbon molar ratio throughout the biochar material.

The oxygenated biochar can have any suitable specific surface area (SSA), as commonly determined by BET analysis. In different embodiments, the oxygenated biochar has an SSA value of about, or at least, or no more than 0.1, 0.5, 1, 2, 3, 4, 5, 10, 15, 20, 25, 30, 35, 40, 45, 50, 55, 60, or 65 $m^2/g$, or an SSA value within a range bounded by any two of the foregoing values.

The oxygenated biochar can also have any suitable charge density. In different embodiments, the oxygenated biochar has a charge density of about, or at least, or no more than 1, 2, 3, 4, 5, 10, 15, 20, 25, 30, 35, 40, 45, 50, 55, 60, 65, 70, or 75 $mmol/m^2$, or a charge density within a range bounded by any two of the foregoing values.

The oxygenated biochar can also have any suitable carbon, nitrogen, oxygen, hydrogen, phosphorous, calcium, sulfur, ash, and volatile matter content. The carbon content can be about, at least, or no more than, for example, 20, 25, 30, 35, 40, 45, 50, 55, 60, 65, 70, 75, 80, 85, 90, or 95 mole percent, or within a particular range therein. The nitrogen content can be about, at least, or no more than, for example, 0.1, 0.25, 0.5, 0.75, 1.0, 1.25, 1.5, 1.75, 2.0, 2.25, 2.5, 2.75, 3.0, 3.25, 3.5, 3.75, 4.0, 4.5, 5.0, 6.0, 7.0, or 8.0 mole percent, or within a particular range therein. The oxygen content can be about, at least, or no more than, for example, 1, 2, 5, 10, 15, 20, 25, or 30 mole percent, or within a particular range therein. The hydrogen content can be about, at least, or no more than, for example, 1, 2, 5, 10, 15, 20, 25, or 30 mole percent, or within a particular range therein. The phosphorus or calcium content can independently be about, at least, or no more than, for example, 5, 10, 25, 50, 100, 500, 1000, 5000, 7500, 10000, 15000, 20000, or 25000 mg/kg, or within a particular range therein. The sulfur content can be about, at least, or no more than, for example, 50, 100, 200, 300, 400, 500, 600, 700, 800, 900, 1000, 1500, or 2000 ppm, or within a particular range therein. The ash content can be about, at least, or no more than, for example, 1, 2.5, 5, 10, 15, 20, 30, 40, 50, 60, or 70%, or within a particular range therein. The volatile matter content can be about, at least, or no more than, for example, 1, 2.5, 5, 10, 15, 20, 25, 30, 35, or 40%, or within a particular range therein.

The oxygenated biochar can also have any suitable particle size. In various embodiments, the oxygenated biochar can have a particle size of about, at least, or no more than, for example, 50, 100, 250, 500, 750, 1000, 1500, 2000, 2500, 3000, 3500, 4000, 4500, or 5000 μm, or a particle size within a particular range bounded by any two of the foregoing values. In certain applications (e.g., to ensure the biochar materials are resistant to becoming airborne in windy and/or desert areas), larger biochar particle sizes, such as 6000, 7000, 8000, 9000, 10,000, 20,000, 30,000, 40,000, 50,000 μm, or higher (for example, up to 100,000 μm), or a particle size within a particular range bounded by any two of the foregoing values, may be preferred. The biochar materials may also be in the form of an agglomeration, compaction, or fusion of biochar particles (e.g., pellets or cakes) for this type of application as well. The size of the pellets or cakes can correspond, for example, to any of the larger particle sizes given above.

The term "particle size" as used above for a particular value can mean a precise or substantially monodisperse particle size (e.g., within ±0-5% of the value) or a more dispersed particle size (e.g., greater than 5% and up to, for example, about 50% or 100% of the value). In addition, the biochar particles may have a size distribution that is monomodal, bimodal, or higher modal. The term "particle size" may also refer to an average particle size. If desired, the particle size of the oxygenated biochar can be appropriately modified by techniques known in the art. For example, the biochar particles may be ground, agglomerated, or sieved by any of the techniques known in the art. Furthermore, when the particles or pellets are substantially or completely spherical, the above exemplary particle or pellet sizes refer to the diameter of the particles or pellets. For particles or pellets that are non-spherical (e.g., elliptical, cylindrical, rod-like, plate-like, disc-like, rectangular, pyramidal, or amorphous), the above exemplary particle or pellet sizes can refer to at least one, two, or three of the dimensional axes of the particles or pellets.

The oxygenated biochar can also have any suitable pore size. In various embodiments, the oxygenated biochar can have a pore size of about, at least, or no more than, for example, 0.5, 1, 1.5, 2, 2.5, 3, 3.5, 4, 4.5, 5, 6, 7, 8, 9, 10, 20, 30, 40, 50, 100, 250, 500, 750, 1000, 1500, 2000, 2500, 5000, 6000, 7000, 8000, 9000, 10,000, 20,000, 30,000, 40,000, 50,000, 60,000, 70,000, 80,000, 90,000 or 100,000 nm, or a pore size within a particular range bounded by any two of the foregoing values.

The oxygenated biochar, such as produced by the method described above, may also be admixed (i.e., enriched) in one or more soil-fertilizing compounds or materials. The soil-fertilizing compounds or materials can be, for example, nitrogen-based (e.g., ammonium-based), carbonate-based (e.g., $CaCO_3$), phosphate-based (e.g., the known phosphate minerals, such as in rock phosphate or triple superphosphate), and potassium-based (e.g., KCl). In a particular embodiment, the one or more soil-fertilizing compounds or materials includes at least one nitrogen-containing, and more typically, $NH_4^+$-containing compound or material. Some examples of nitrogen-containing fertilizing compounds or materials include, for example, $(NH_4)_2CO_3$, $NH_4HCO_3$, $NH_4NO_3$, $(NH_4)_2SO_4$, $(NH_2)_2CO$, biuret, triazine-based materials (e.g., melamine or cyanuric acid), urea-formaldehyde resin, and polyamine or polyimine polymers. The fertilizer material may be inorganic, as above, or alternatively, organic. Some examples of organic fertilizer materials include peat moss, manure, insect material, seaweed, sewage and guano. The biochar material can be treated by any of the methods known in the art in order to combine the biochar material with a fertilizer. In a particular embodiment, the biochar material is treated with a gas stream of hydrated ammonia to saturate the biochar material. The biochar material may also be coated with fertilizer compounds or materials. The coating may also be suitably modified or optimized as known in the art to adjust the rate of release of one or more fertilizer compounds or materials into soil. In another embodiment, one or more of the above generic or specific soil-fertilizing compounds or materials are excluded from the oxygenated biochar composition.

In another embodiment, the invention is directed to a soil formulation containing, at minimum, soil admixed with the biochar composition described above. The soil can be of any type and composition. For example, the soil can have any of the numerous and diverse proportions of clay, sand, and silt. The sand, silt, and clay components can be independently present in an amount ranging from substantially absent (i.e., zero weight percent or in trace amounts) up to precisely or substantially 100 weight percent (e.g., exactly 100% or at least 98 or 99%). In different embodiments, one or more of the sand, silt, and clay components are in an amount of, independently, about, at least, or no more than, for example, 0.1, 0.5, 1, 2, 5, 10, 15, 20, 25, 30, 35, 40, 45, 50, 55, 60, 65, 70, 75, 80, 85, 90, or 95 weight percent of the total weight of the soil absent the biochar. The soil may also preferably have one or more of the sand, silt, and clay components present in an amount within a range bounded by any two of the foregoing exemplary weight percentages. The soil can also contain any amount of humus and humic substances (i.e., organic matter), humic acid, fulvic acid, cellulose, lignin, peat, or other such component, in any of the exemplary amounts or ranges given above.

Examples have been set forth below for the purpose of illustration and to describe certain specific embodiments of the invention. However, the scope of this invention is not to be in any way limited by the examples set forth herein.

Example 1

Sample Preparation

All samples were assayed in duplicate for each procedure. The water used for preparation of all solutions and rinsing of glass ware was purified with a Mi11iTMQ water system (Millipore Corporation, Bedford, Mass.) attached to a house distilled water line. All incubations of char materials with solutions were carried out at ambient temperature (21-25° C.). A rotary shaker (innova 2100 platform shaker) was used to agitate samples during incubation. Weights less than 100 g were determined with a Mettler AE163 analytical balance while weights greater than 100 g were determined with a Mettler PM 4600 Delta range top loader balance. A vacuum oven (Cole Parmer, Chicago, Ill. 60648) connected to a house vacuum line was used to dry samples. Centrifugation was carried out in an Avanti J25I Centrifuge (Beckman Instruments, Palo Alto, Calif.) using a JLA 25.5 rotor. Conductivity measurements were made with a Traceable Portable Conductivity Meter (VWR International, Suwanee, Ga.), ISO 17025 calibrated, that was calibrated before each use with One Shot Traceable Conductivity Standards of 100.6 and 998 µS/cm. The pH of the sample suspensions and solutions was determined with a Beckman Φ72 pH meter (Beckman Instruments Inc., Fullerton, Calif.).

All test materials were ground for 4 minutes in a SPEX CertiPrep 8000-D Mixer mill with 1-cm steel balls. Part of each ground material (5 g) was suspended in 20 mL water and wet-sieved with a No. 140 ASTM E-11 testing sieve (VWR Scientific, Westchester, Pa.) with a mesh size of 106 micrometer (0.0041 inches). The particles were washed through the sieve with a total of 100 mL water per 5 g ground sample. The char particles were pelleted from the aqueous slurry after sieving by centrifugation at 20,000 rpm (48,384 G) for 15 minutes at 14° C. They were re-suspended in a minimal volume of water and transferred to glass sample jars, and then dried in a vacuum oven at 70° C. and 21 psi for 40 hours.

Duplicate samples of approximately 0.5 g of each material to be tested were placed in pre-weighed centrifuge tubes with screw cap lids (Beckmann, Inc.). The tubes were then weighed to determine the exact weights of each sample.

Example 2

Determination of CEC Values of Biochar Samples

A modified barium chloride compulsive exchange method was used to determine the CEC for the agricultural char samples and a soil control from a standard test site in West Tennessee (University of Tennessee C-site). The method used is in accordance with the method described in Skjemstad, J. O., et al., "The Measurement of Cation Exchange Capacity of Organic Matter Fractions from Soils using a Modified Compulsive Exchange Method," *Communications in Soil Science and Plant Analysis*, 39(5-6), 926-937 (2008)).

For barium loading, 30 mL of 0.5 M barium chloride solution was added to each tube. The char samples were mixed by vortexing, then incubated for 2-18 hours on a shaker. The chars were pelleted by centrifugation for 15 minutes at 20,000 rpm (48,384 G) and 14° C. in a Beckman High Speed centrifuge. The barium chloride equilibration was repeated a total of four times, with adjustment of the pH to 8.5 in the barium chloride solution by addition of barium hydroxide solution during the last two barium chloride incubations.

The samples were then washed twice by re-suspension in 30 mL of 0.05 M barium chloride, and three times with 0.002 M barium chloride by re-suspension, followed by incubation for 1 hour on the shaker, and then centrifugation.

The barium-equilibrated samples were dried in the tubes for 40 hours at 70° C. and 21 psi. The tubes containing the dried samples were re-weighed to correct sample weight for losses during centrifugation.

Each dried sample was re-suspended in 20 mL of 0.01 M $MgSO_4$ solution. The tubes were weighed again to determine the exact amount of solution added to each sample so that the amount of $Mg^{2+}$ added could be accurately determined for the CEC calculation. The samples were incubated with the $MgSO_4$ solution for 20 hours. The conductivity of each sample suspension was then determined and compared to the conductivity of 0.0015 M $MgSO_4$ standard solution. If greater than that of the 0.0015 M $MgSO_4$ solution, the sample was transferred to a pre-weighed 250-mL polypropylene bottle and water was added until the sample conductivity matched that of the standard solution. If the conductivity was less, then more 0.01 M $MgSO_4$ solution was added until the conductivity matched the standard. The container holding the sample and solution was then weighed.

Following the initial CEC determination for the chars loaded with barium at pH 8.5, the suspensions were adjusted to lower pH values by addition of 0.010 M $H_2SO_4$. The titration containers were weighed after addition of the acid to determine the amount of acid required for each pH adjustment. The conductivity of each sample suspension was determined and adjusted to match that of 0.0015 M $MgSO_4$ for each pH value measured.

A modified CEC procedure using ten-fold concentrated (0.100M) $MgSO_4$ for barium displacement and 0.015 M $MgSO_4$ for conductivity titration matching was also carried out on char samples 1 and 2 and soil control 15.

The CEC in cmol(+)/kg for each titration was calculated as described (Skjemstad, J. O., et al., Ibid.) from the weights determined during the procedure using the equations:

$$A = \text{(weight of MgSO}_4\text{ solution in g)(1 g/mL solution)}$$
$$(0.02 \text{ M } \tfrac{1}{2}\text{MgSO4})$$

$$B = (W_2 - W_1)(0.003)$$

$$(A-B)(100)/(\text{sample weight in g})$$

In the above equations, A=mmol of ½ $MgSO_4$ added and B=mmol ½ $MgSO_4$ remaining in solution. B is calculated by subtracting the weight of the titration container and sample ($W_1$) from the total weight of sample container and solution at the end of the conductivity titration ($W_2$) and multiplying by 0.003, the concentration of ½ $MgSO_4$ (which is equivalent to monovalent cations) at the titration endpoint. It should be noted that the values of the CEC expressed in units of cmol (+)/kg are equivalent to the same values expressed in units of mequiv/100 g.

Example 3

Results of CEC Analysis

To test the accuracy of the conductivity assay method for low CEC values, four 20-mL aliquots of 0.010 M $MgSO_4$ were weighed and titrated to a conductivity corresponding to 0.0015 M $MgSO_4$. Assuming a simulated sample size of 0.5 g, an average value of −2.750±0.2903 cmol (+)/kg was obtained.

The observed cation exchange capacity of the agricultural chars varies depending on the type of pyrolytic treatment (Table 1, FIG. 1). For corn stover samples, the gasification char had lower CEC than the fast pyrolytic char.

Figure 2:
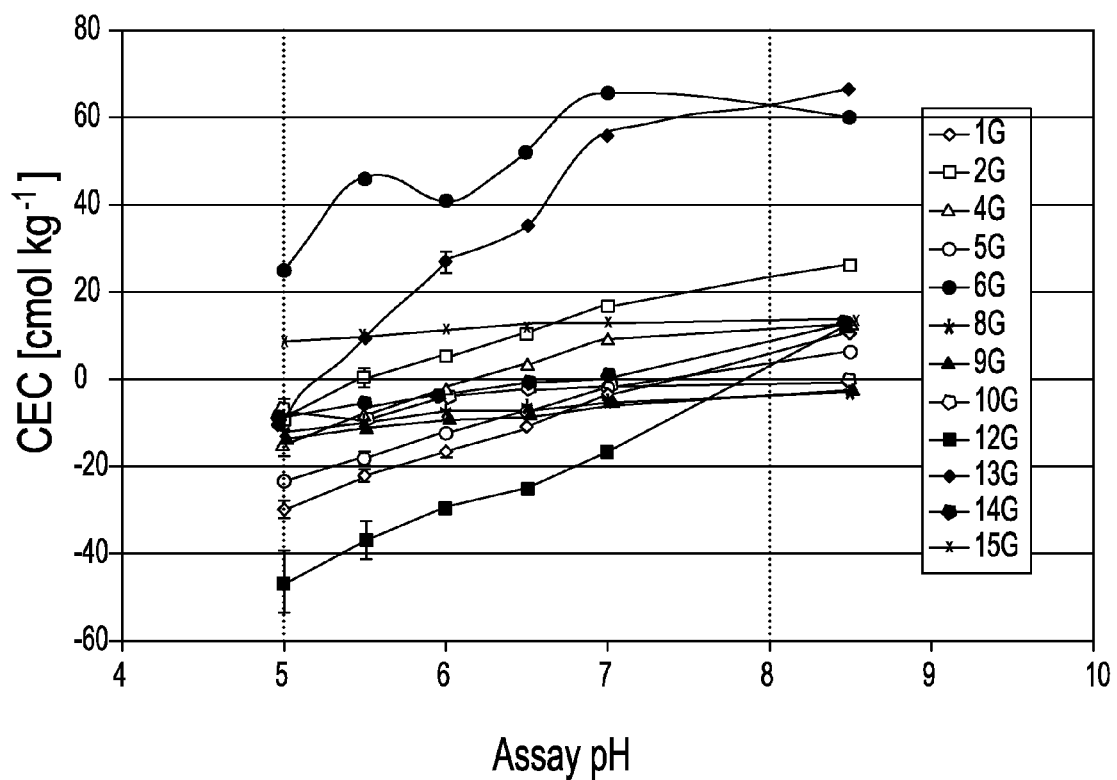
FIG. 2. Chart showing cation exchange capacities (CECs) of biochars and a soil control sample (#15) that were ground for 4 minutes as determined for pH values of 5.0 to 8.5.
Figure 3:
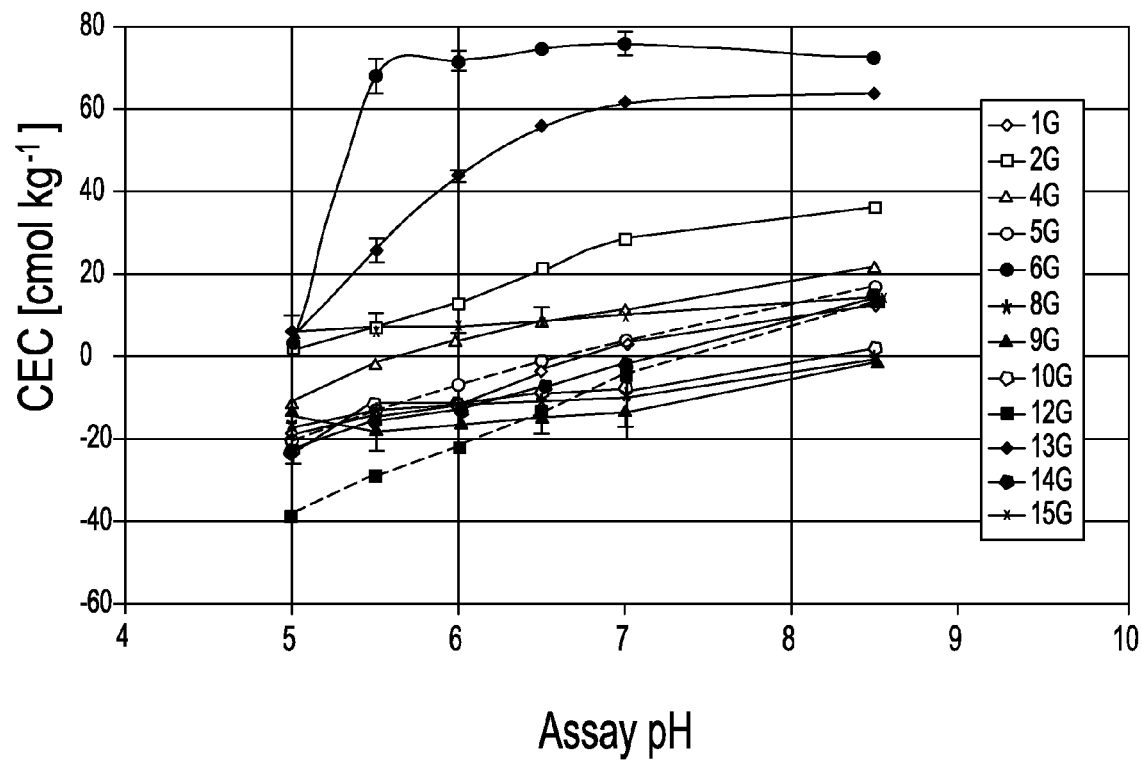
FIG. 3. Chart showing cation exchange capacities (CECs) of ground and sieved biochars and a soil control sample (#15) as determined for pH values of 5.0 to 8.5.
Figure 4:
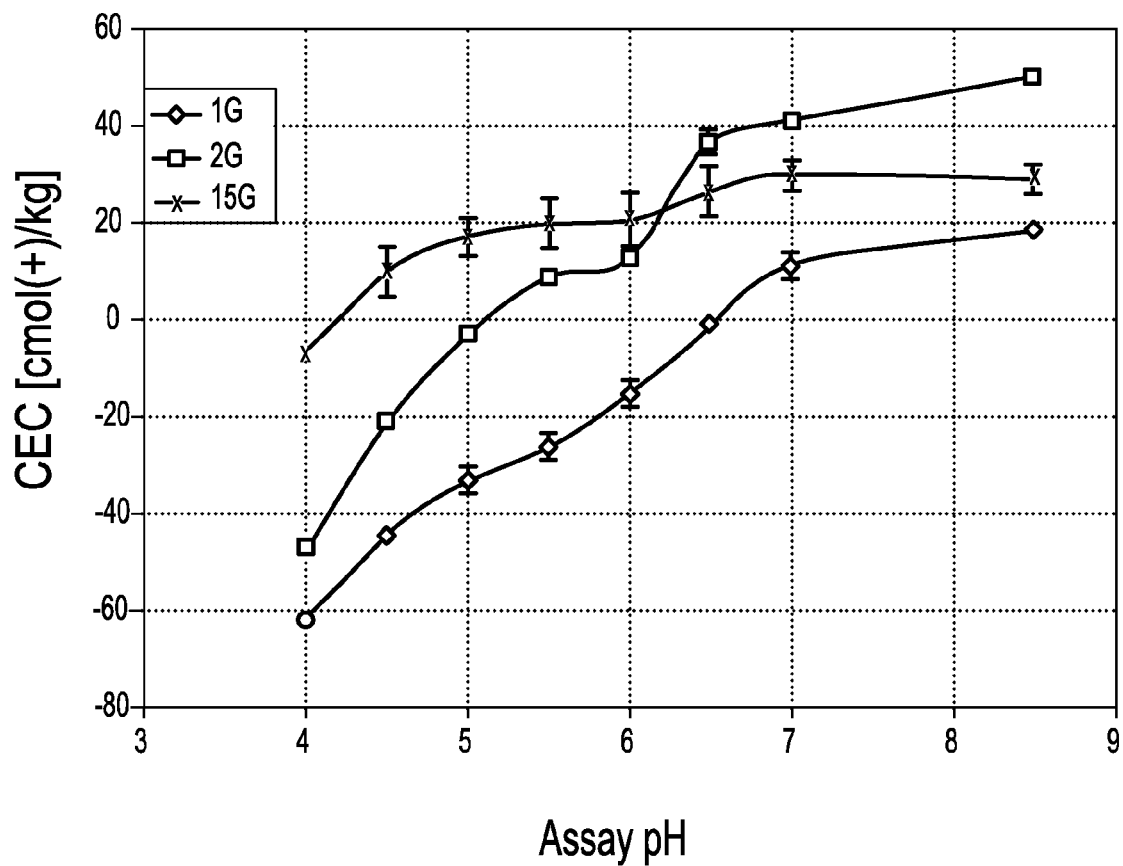
FIG. 4. Chart showing the effect of $MgSO_4$ concentration on CEC assays as shown on corn stover biochars 1G and 2G and control sample #15 in which the concentration of $MgSO_4$ used for displacement was increased ten-fold to 0.10 M and matching of conductivity was according to a 0.015 M $MgSO_4$ solution.
Figure 5:
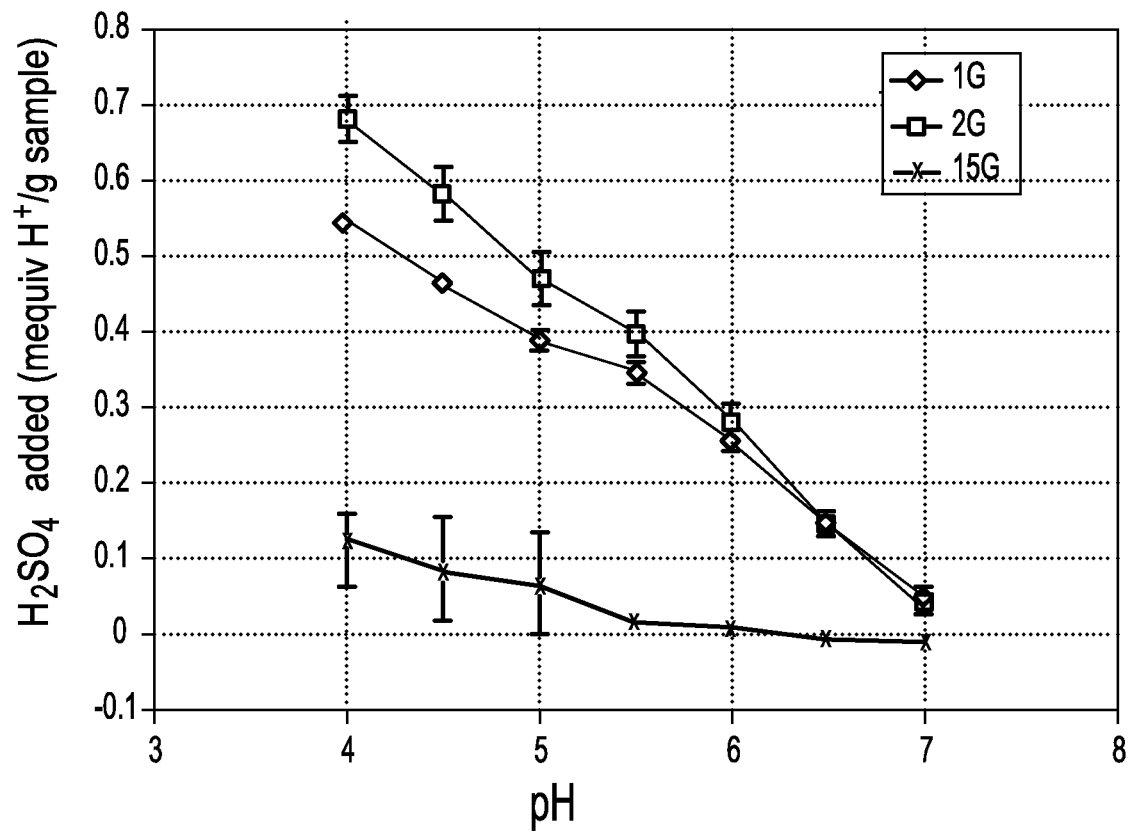
FIG. 5. Chart showing the effect of addition of acid on pH of corn stover samples 1G and 2G as compared to soil control sample #15.

Negative CEC values were observed for pH values less than 7 (FIGS. 2, 3, 4). The pH curves for the CEC values show that the chars have ion exchange characteristics similar to those observed for humic substances. Acidification appears to result in release of bound cations, probably $Ca^{2+}$, at pH values lower than 7, resulting in negative CEC values. Similar results due to the presence of $Ca^{2+}$ bound to soil organic matter have been reported (Skemstad et al., Ibid). The probable cause of the negative values is the inability of the barium to displace all of the bound cations during the loading at pH 8.5. The char samples may have low binding affinity for $Mg^{2+}$ similar to that reported for humic substances, which may also influence the CEC determination by barium chloride-magnesium sulfate displacement (see, for example, Manahan, Stanley E., *Environmental Chemistry*, Sixth Edition, CRC Press, Boca Raton, Fla., pp. 80, 123, 128, 118, 443, 449, 480 (1999)). The char samples required the addition of much larger amounts of sulfuric acid to adjust the pH than did the soil control (FIG. 5). Results obtained from structural determinations of pyrolysis oils derived from biomass indicate that the lignin residues survive pyrolysis largely intact (see, for example, Fratini E., et al., *Langmuir* 22, 306-312 (2006)).

The assays that used 0.1 M $MgSO_4$ to displace the barium gave CEC values approximately twice those obtained with the concentration (0.01 M) described in the literature (Table 4 and FIG. 4). This observation appears to indicate that the lower concentration of $Mg^{2+}$ is not sufficient to force exchange all of the loaded $Ba^{2+}$ from the char materials.

Figure 6:
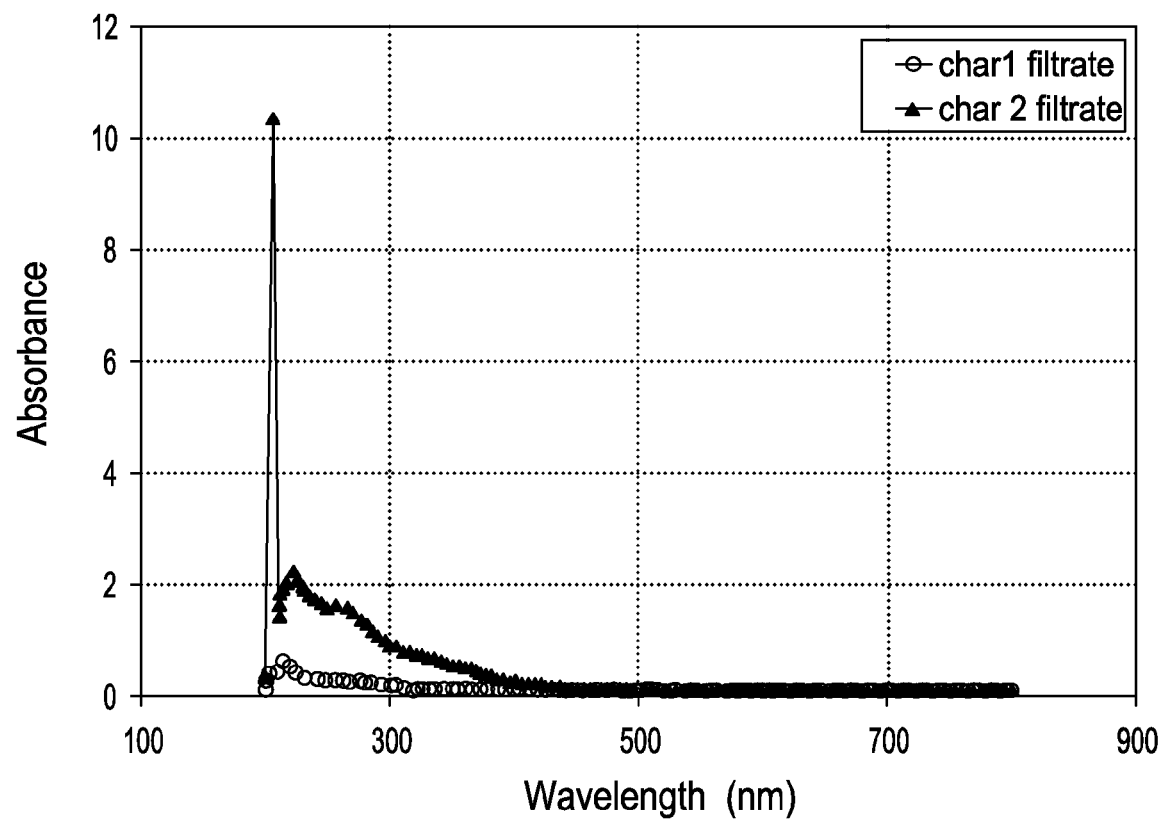
FIG. 6. Chart showing UV-visible absorbance scans of the aqueous extracts from the wet sieve procedure from char sample #1 (gasification) and char sample #2 (fast pyrolysis) from corn stover.

The CEC values were determined for the wet-sieved char and soil samples (Table 2). The effect of the wet sieve treatment on the CEC varied depending on the sample. The CEC values obtained were similar to those before sieving for chars 2, 4, 5, 6, and 13, but decreased two-fold or greater for chars 1, 8, 9, 10, 12, 14, and soil control 15. The recovery of the char samples and soil control from the wet sieving procedure was determined by drying and weighing the sieved particles with size less than 106 µm and the residue greater than 106 µm remaining on the sieve (Table 3). No correlation between the amount of material lost during sieving due to particle size greater in size than 106 µm following grinding and the CEC values following sieving was apparent. Following the wet sieve procedure, it was noted that the aqueous extract from the char 2 had a dark brown color, while the extracts from the other chars had little or no color. The aqueous extracts from chars 1 and 2 were scanned in a UV visible spectrophotometer (Unicam) from 200 to 800 nm (FIG. 6). The extract from char 2 had strong absorbance in the UV region characteristic of phenolic and carbonyl groups, which is consistent with the survival of parts of the lignin in the biomass following the pyrolysis.

The results reported here for the CEC values of several modern biochars and a soil control range from –0.5 to 72 cmol $kg^{-1}$. It is apparent from these results that both the biomass feed stock and the process conditions used to produce a biochar material determine the resultant CEC. This information assists the evaluation of the possible biochar processes for utility in production of soil amendments and carbon sequestration.

TABLE 1

Cation Exchange Capacities (CECs) in cmol $kg^{-1}$ of Ground Biochars

| ID | Sample Description | pH 8.5 | pH 7.0 | pH 6.5 | pH 6.0 | pH 5.5 | pH 5.0 |
|---|---|---|---|---|---|---|---|
| 1G | Gasification char, ISU cornstover[1]; 700° C. | 10.28 ± 2.909 | −4.122 ± 0.6723 | −11.24 ± 0.4341 | −17.32 ± 0.7856 | −22.66 ± 0.9959 | −30.68 ± 2.065 |
| 2G | Fast Pyrolytic Char; ISU cornstover[2]; 450° C. | 26.36 ± 0.1676 | 16.61 ± 0.7769 | 10.66 ± 1.314 | 5.117 ± 1.014 | −0.02833 ± 1.921 | −9.468 ± 2.848 |
| 4G | PNC-EP char[3] | 12.45 ± 0.2656 | 8.819 ± 0.6988 | 3.470 ± 0.7736 | −2.041 ± 1.294 | −8.511 ± 1.457 | −15.80 ± 3.133 |
| 5G | PNC-M char[4] | 6.223 ± 0.6391 | −2.408 ± 1.133 | −8.138 ± 1.123 | −12.50 ± 2.056 | −18.73 ± 1.487 | −24.34 ± 1.033 |
| 6G | PNC-B char[5] | 60.12 ± 0.1930 | 66.09 ± 0.167 | 52.45 ± 0.3909 | 40.89 ± 0.1520 | 46.28 ± 0.2058 | 24.77 ± 2.212 |
| 8G | PIC-EP char[6] | −4.582 ± 0.563 | −6.579 ± 0.9563 | −7.696 ± 0.7338 | −8.599 ± 0.9056 | −10.85 ± 0.4820 | −12.77 ± 0.9918 |
| 9G | PIC-M char[7] | −3.783 ± 0.0459 | −5.996 ± 0.02129 | −7.813 ± 0.2284 | −9.270 ± 0.1137 | −11.58 ± 0.2635 | −13.12 ± 0.1547 |
| 10G | PIC-NS char[8] | −0.6781 ± 0.2571 | −2.036 ± 0.3127 | −3.041 ± 0.1261 | −4.350 ± 0.2064 | −10.43 ± 0.01491 | −7.870 ± 0.3338 |
| 12G | "High" char[9] | 12.02 ± 0.2717 | −17.29 ± 1.680 | −25.44 ± 0.3590 | −29.59 ± 1.038 | −37.60 ± 4.350 | −47.10 ± 7.218 |
| 13G | "Active" char[10] | 66.56 ± 0.2235 | 55.93 ± 0.2662 | 35.26 ± 0.02404 | 26.72 ± 2.333 | 9.111 ± 0.7991 | −7.739 ± 3.478 |
| 14G | "Med" char[11] | 12.64 ± 0.4754 | −0.02076 ± 0.1457 | −2.063 ± 0.7398 | −3.963 ± 0.4391 | −6.898 ± 0.9596 | −9.688 ± 0.5129 |
| 15G | Control soil[12] | 12.51 ± 0.3032 | 13.40 ± 0.254 | 12.23 ± 0.03203 | 11.32 ± 0.2283 | 9.651 ± 0.07363 | 8.396 ± 0.1760 |

[1]Gasification char refers to a corn stover source that was processed by a gasification method at 700° C. by Iowa State University.
[2]Pyrolysis char refers to a corn stover source that was processed by a fast pyrolysis method at 450° C. by Iowa State University.
[3]PNC-EP char refers to an Eprida pelletized peanut hull source that has been subjected to continuous steam gassification at 400° C.
[4]PNC-M char refers to an Eprida pelletized peanut hull source that has been subjected to batch steam gassification at 400° C.
[5]PNC-B char refers to an Eprida pelletized peanut hull source that has been subjected to batch barrel pyrolysis with no temperature control or monitoring.
[6]PIC-EP char refers to an Eprida southern yellow pine chip source that has been subjected to continuous steam gassification at 400° C.
[7]PIC-M char refers to an Eprida southern yellow pine chip source that has been subjected to batch steam gassification at 400° C.
[8]PIC-NS refers to an Eprida southern yellow pine chip source that has been subjected to a no-steam process with batch nitrogen purge at 400° C.
[9]"High" char refers to an Eprida pelletized peanut hull source that has been subjected to a continuous no-steam process at 500° C. and higher temperatures.
[10]"Active" char refers to an Eprida pelletized peanut hull source that has been subjected to a continuous steam activation process.
[11]"Med" char refers to an Eprida pelletized peanut hull source that has been subjected to a continuous no-steam process at about 400° C. (average temperature).
[12]Control soil is Milan top soil from a standard test site, the C-site, in Milan, Tennessee, which is operated by the University of Tennessee.

TABLE 2

Cation Exchange Capacities (CECs) in cmol kg$^{-1}$ of Ground and Sieved Biochars

| ID | Sample Description | pH 8.5 | pH 7.0 | pH 6.5 | pH 6.0 | pH 5.5 | pH 5.0 |
|---|---|---|---|---|---|---|---|
| 1G | Gasification char, ISU cornstover; 700° C. | 11.90 ± 2.073 | 3.360 ± 1.087 | −3.346 ± 0.8796 | −12.08 ± 1.956 | −15.97 ± 0.5680 | −18.041 ± 1.965 |
| 2G | Fast Pyrolytic Char; ISU cornstover; 450° C. | 36.44 ± 1.343 | 28.77 ± 1.325 | 20.88 ± 0.3771 | 12.98 ± 0.5498 | 6.975 ± 0.4068 | 1.562 ± 0.8476 |
| 4G | PNC-EP char | 21.97 ± 0.5838 | 11.70 ± 0.1341 | 8.411 ± 0.2523 | 3.458 ± 0.1449 | −1.617 ± 1.685 | −11.18 ± 1.298 |
| 5G | PNC-M char | 17.31 ± 1.114 | 3.485 ± 0.2594 | −1.596 ± 0.5917 | −6.688 ± 1.088 | −12.75 ± 1.060 | −19.77 ± 0.5998 |
| 6G | PNC-B char | 72.72 ± 0.9176 | 76.15 ± 2.648 | 75.01 ± 1.096 | 71.86 ± 2.291 | 68.15 ± 3.886 | 2.024 ± 0.1075 |
| 8G | PIC-EP char | −0.5769 ± 0.02178 | −10.89 ± 0.3902 | −11.52 ± 0.09341 | −12.67 ± 0.2194 | −14.44 ± 0.05005 | −16.46 ± 1.261 |
| 9G | PIC-M char | −0.05603 ± 0.5737 | −13.66 ± 3.787 | −15.06 ± 4.020 | −17.13 ± 4.026 | −18.88 ± 4.761 | −13.83 ± 0.8221 |
| 10G | PIC-NS | 2.154 ± 0.3423 | −8.025 ± 1.220 | −9.158 ± 0.9920 | −10.72 ± 0.8694 | −11.82 ± 0.7252 | −21.02 ± 5.470 |
| 12G | "High" char | 12.89 ± 1.513 | −5.100 ± 0.6864 | −13.53 ± 0.4118 | −22.89 ± 0.1646 | −29.40 ± 0.05028 | −39.19 ± 1.443 |
| 13G | "Active" char | 63.78 ± 0.8485 | 61.51 ± 0.6145 | 55.67 ± 0.5101 | 43.82 ± 1.307 | 25.53 ± 2.748 | 3.804 ± 2.252 |
| 14G | "Med" char | 13.78 ± 1.998 | −2.228 ± 1.549 | −7.956 ± 1.946 | −12.52 ± 0.6612 | −16.49 ± 0.9043 | −22.84 ± 0.4119 |
| 15G | Control soil | 14.05 ± 1.114 | 9.881 ± 2.850 | 8.972 ± 2.695 | 8.202 ± 2.831 | 7.724 ± 2.403 | 6.346 ± 2.193 |

TABLE 3

Yields* of Sieved Chars

| ID | Sample Description | % <106 μm | % >106 μm |
|---|---|---|---|
| 1G | Gasification char; Source: ISU cornstover; Temperature: 700 C. | 95.50 | 0.000 |
| 2G | Fast Pyrolytic Char; Source: ISU cornstover; Temperature: 450 C. | 96.98 | 0.6537 |
| 4G | PNC-EP char; Source: Eprida peanut hull | 68.77 | 10.16 |
| 5G | PNC-M char; Source: Eprida peanut hull | 83.55 | 8.130 |
| 6G | PNC-B char; Source: Eprida peanut hull | 59.98 | 26.00 |
| 8G | PIC-EP char; Source: Eprida southern yellow pine | 85.64 | 3.303 |
| 9G | PIC-M char; Source: Eprida southern yellow pine | 94.63 | 2.044 |
| 10G | PIC-NS; Source: Eprida southern yellow pine | 79.90 | 9.830 |
| 12G | "High" char; Source: Eprida peanut hull | 55.30 | 32.29 |
| 13G | "Active" char; Source: Eprida peanut hull | 80.09 | 0.000 |
| 14G | "Med" char; Source: Eprida peanut hull | 65.97 | 20.88 |
| 15G | Control soil sample: Milan soil from 0-15 cm deep | 93.95 | 1.460 |

*The percent yield of the sieved char samples was determined for particles that passed through a 106-μm sieve, and separately, on particles greater than 106 μm that did not pass through the sieve.

The ground corn stover char samples and soil control were also assayed by a modified CEC method in which the concentration of $MgSO_4$ used for the displacement step was increased ten-fold to 0.100 M, and the final $MgSO_4$ concentration for the titration end-points was concomitantly increased to 0.015 M. The CEC results are shown below in Table 4.

TABLE 4

| ID | Sample Description (4-min grind) | CEC [cmol kg$^{-1}$] |
|---|---|---|
| 1G | Gasification char; Source: ISU cornstover; Temperature: 700° C. | 19.251 ± 0.1488 |
| 2G | Fast Pyrolytic Char; Source: ISU cornstover; Temperature: 450° C. | 50.967 ± 1.890 |
| 15G | Control soil sample: Milan soil from 0-15 cm deep | 29.853 ± 3.098 |

The assays that used 0.1 M $MgSO_4$ to displace the barium gave CEC values approximately twice those obtained with the concentration (0.01 M) described in the literature (Table 4 and FIG. 4). This observation appears to indicate that the lower concentration of $Mg^{2+}$ is not sufficient to force exchange all of the loaded $Ba^{2+}$ from the char materials.

Example 4

Fourier-Transform Infrared Spectroscopy (FTIR) Analysis and Results Infrared spectra were recorded on a Digilab FTS 7000 FTIR spectrometer, collected in transmittance, resolution of 4 cm$^{-1}$, 200 scans. Samples were prepared in KBr, 10 wt %, and pressed into a pellet. Spectra shown are normalized at 1800 cm$^{-}$.

Figure 7:
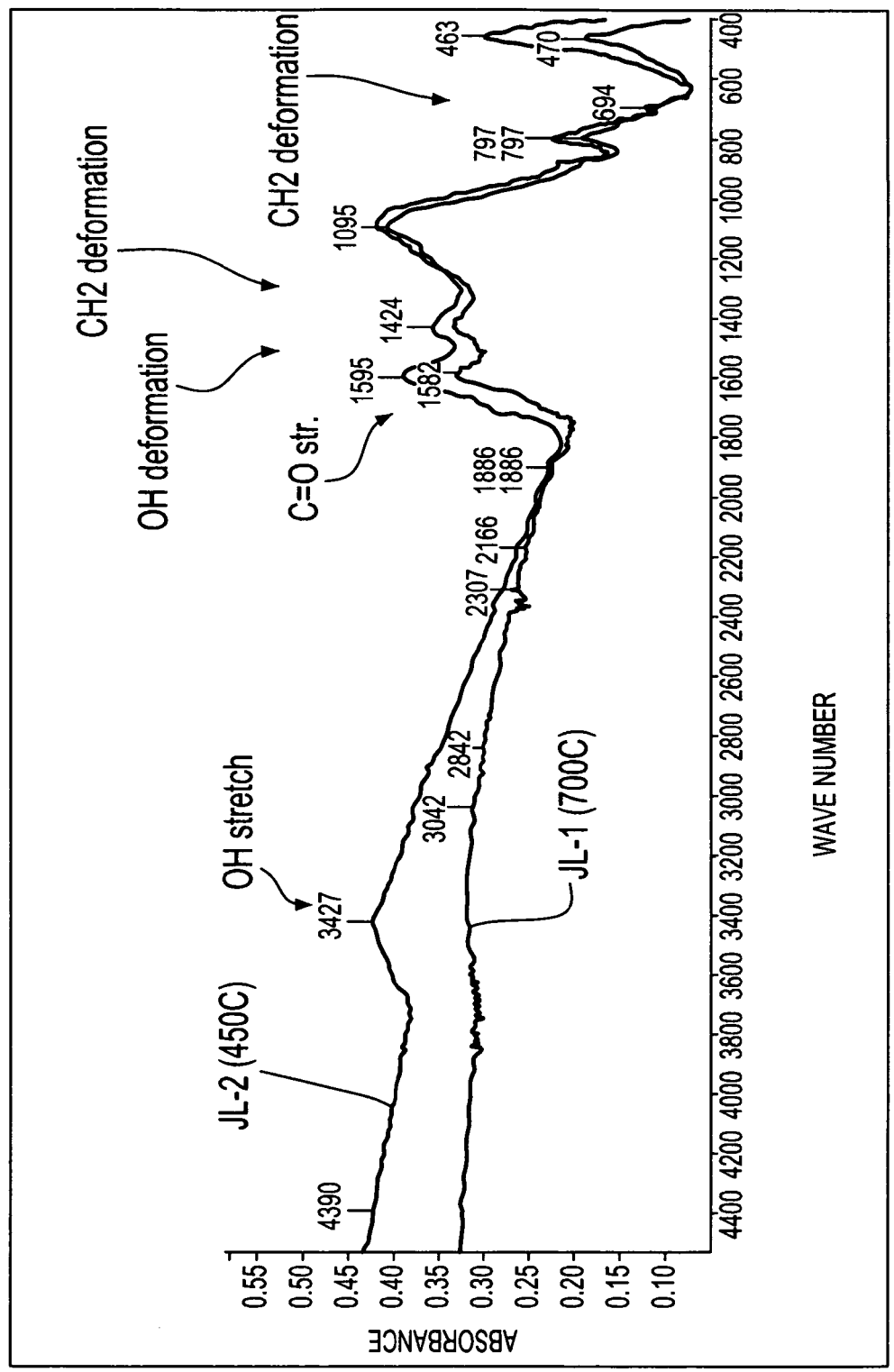
FIG. 7. FTIR spectrum of char samples #1 and #2. KBr pellet 10 wt %.

Samples 1 and 2 of the gasification char (700° C.) and fast pyrolytic char (450° C.) ISU cornstover show characteristic bands similar to that of cellulose (FIG. 7). A medium intensity broad peak at 3600-3175 cm$^{-1}$ (OH stretch), shoulder at 1725 cm$^{-1}$ (C=O stretch), 1595 cm$^{-1}$ (OH deformation), weak, broad peak at 1424 cm$^{-1}$ ($CH_2$ deformation-intensity affected by the degree of crystallinity)[1], 1095 cm$^{-1}$ (C—O stretch possibly), 792 cm$^{-1}$ ($CH_2$ deformation).

Figure 8:
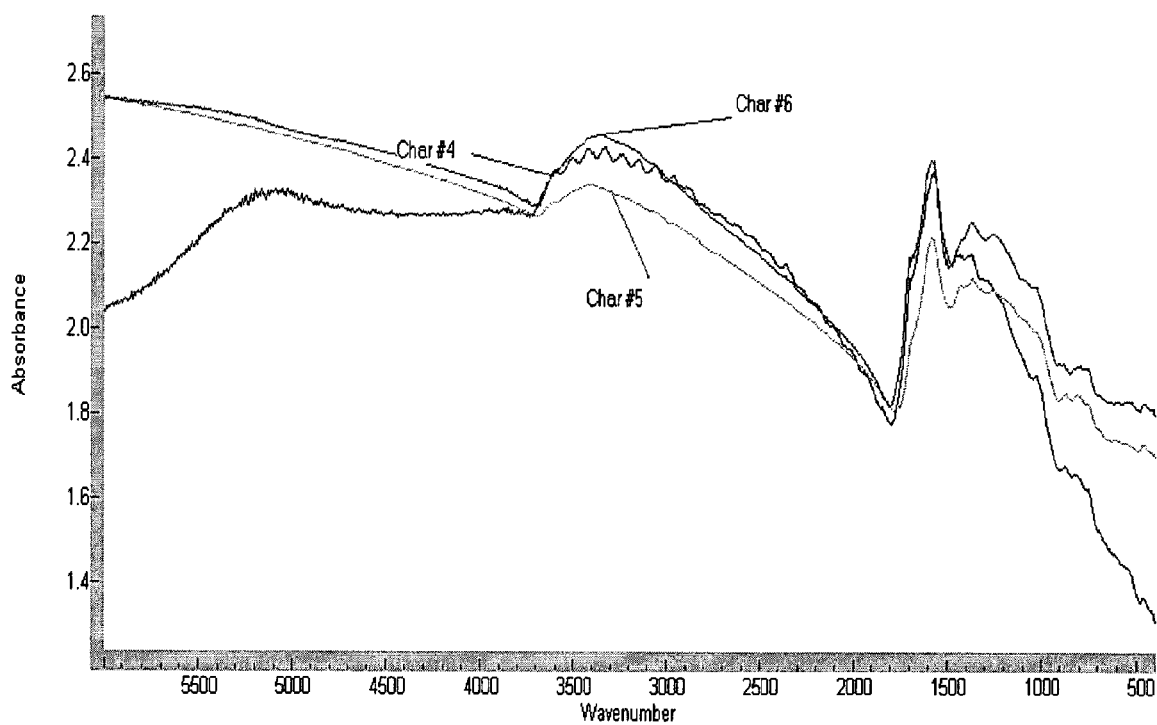
FIG. 8. FTIR spectrum of char samples #4, #5, and #6 (peanut hull from Eprida).
Figure 9:
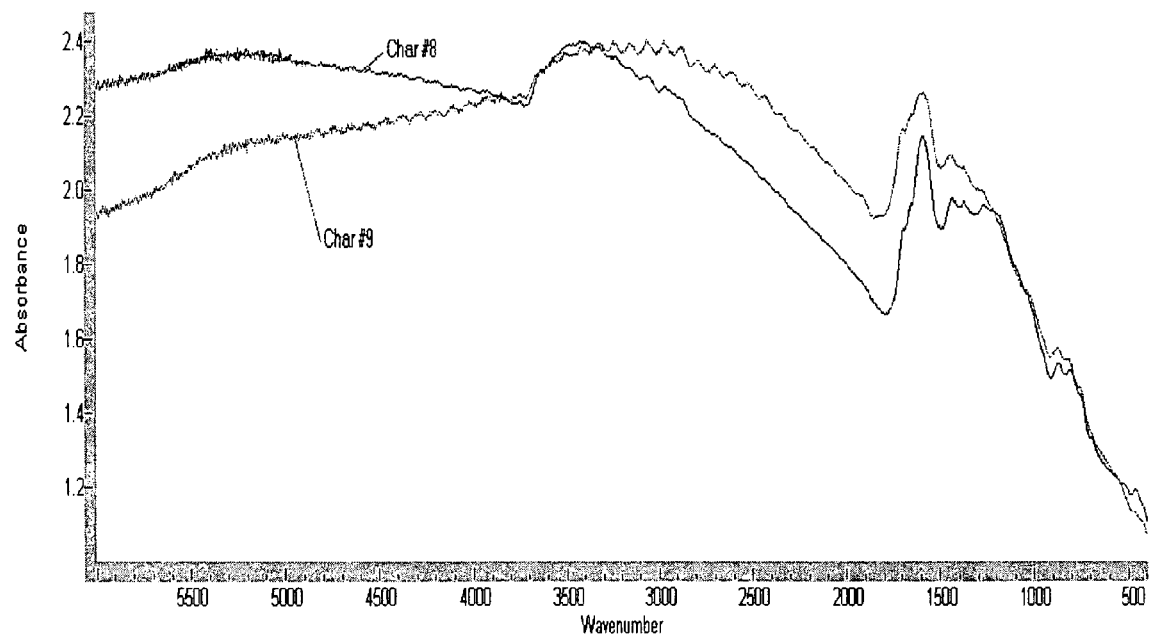
FIG. 9. FTIR spectrum of char samples #8 and #9 (southern yellow pine from Eprida).
Figure 10:
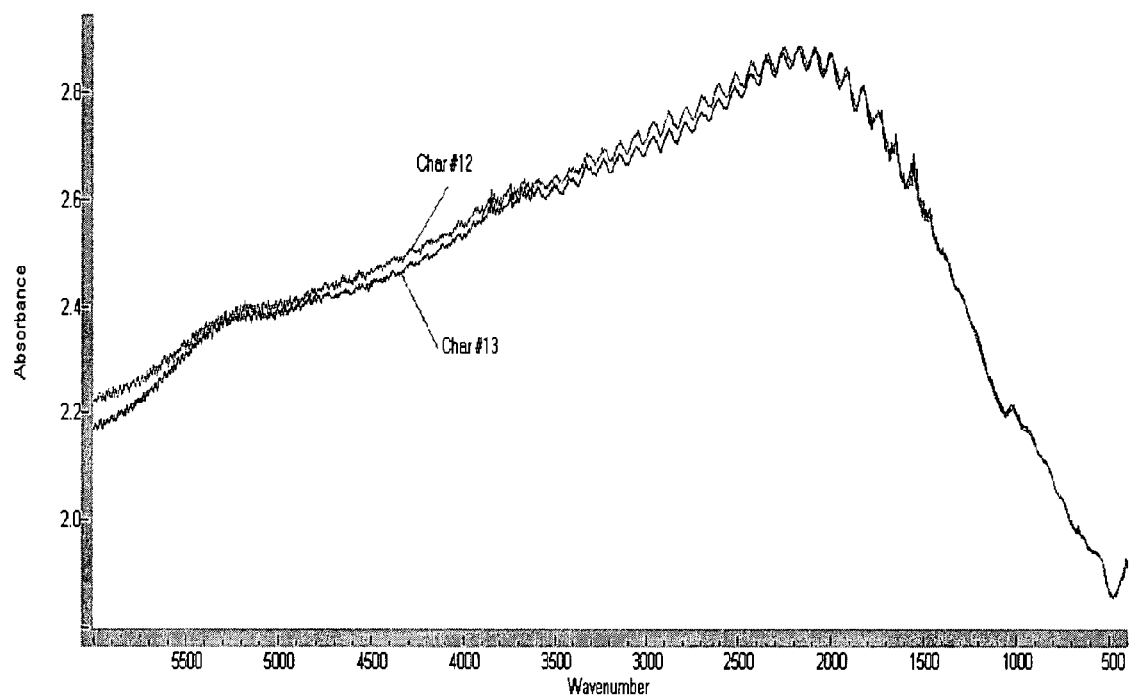
FIG. 10. FTIR spectrum of char samples #12 and #13 (peanut hull from Eprida, "high" and "active", respectively.
Figure 11:
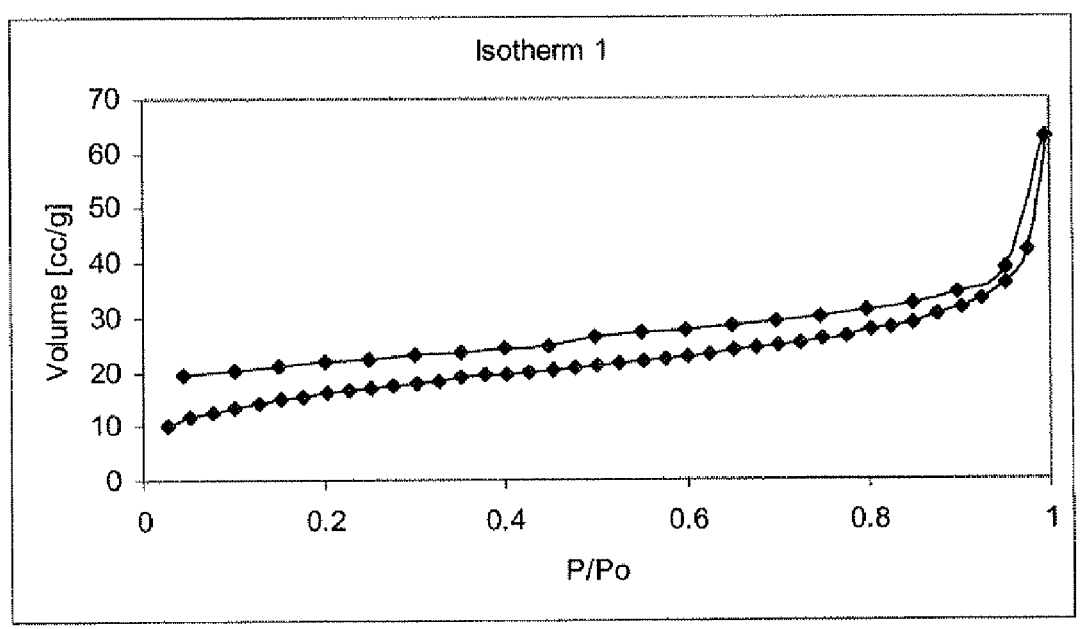
FIG. 11. Adsorption-desorption isotherm of sample #1 (corn stover gasification char, 700° C.).
Figure 12:
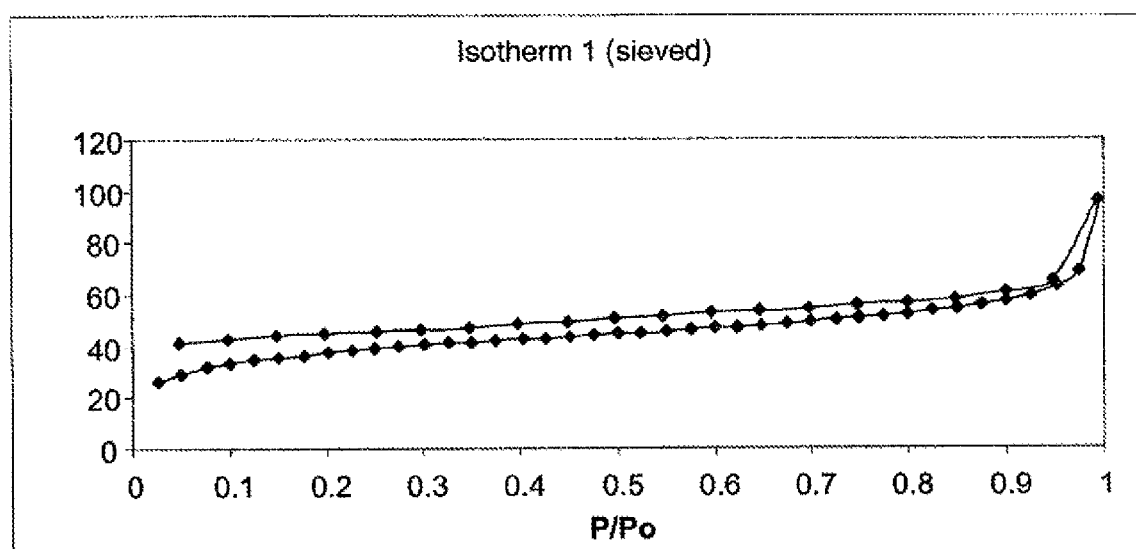
FIG. 12. Adsorption-desorption isotherm of sample #1 (corn stover gasification char, 700° C.), wet-sieved on 160 μm filter.
Figure 13:
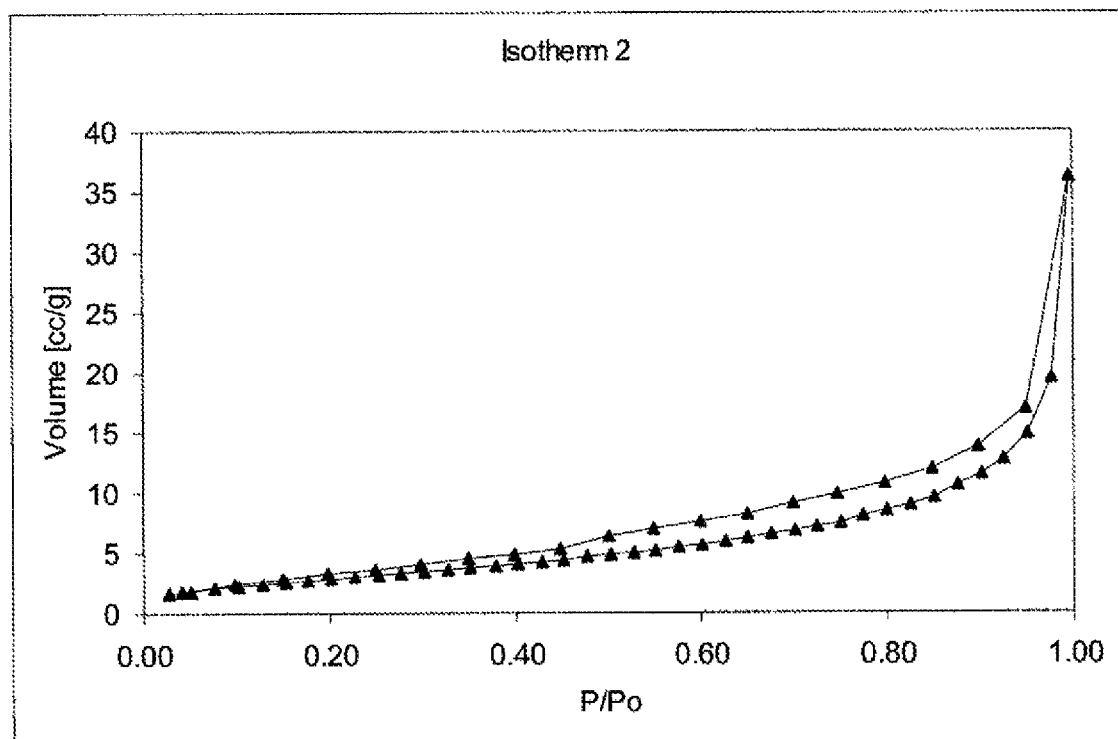
FIG. 13. Adsorption-desorption isotherm of sample #2 (corn stover fast pyrolytic char, 450° C.).
Figure 14:
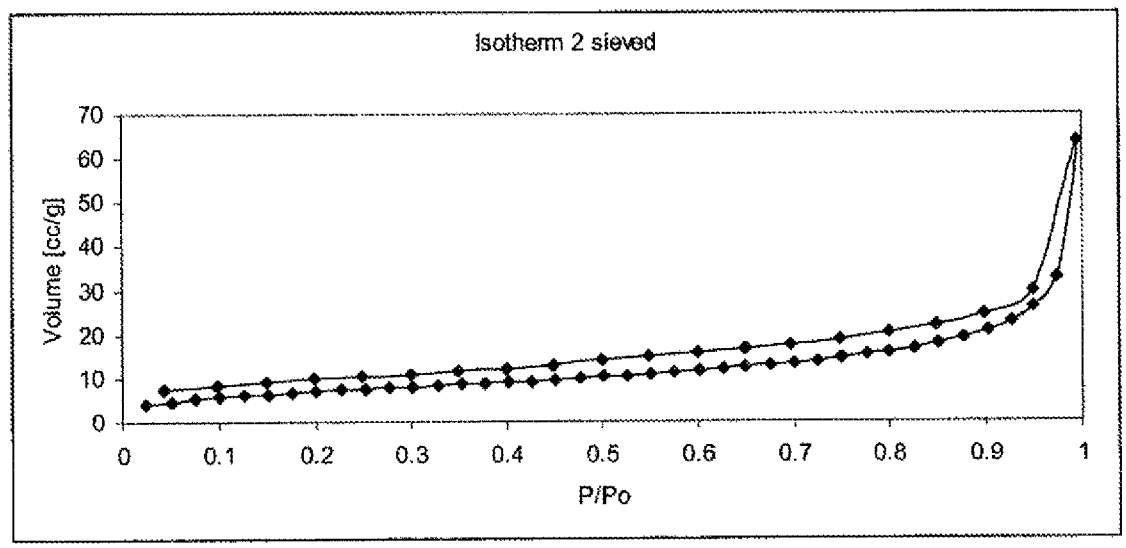
FIG. 14. Adsorption-desorption isotherm of sample #2 (corn stover fast pyrolytic char, 450° C.), wet-sieved on 160 μm filter.
Figure 15:
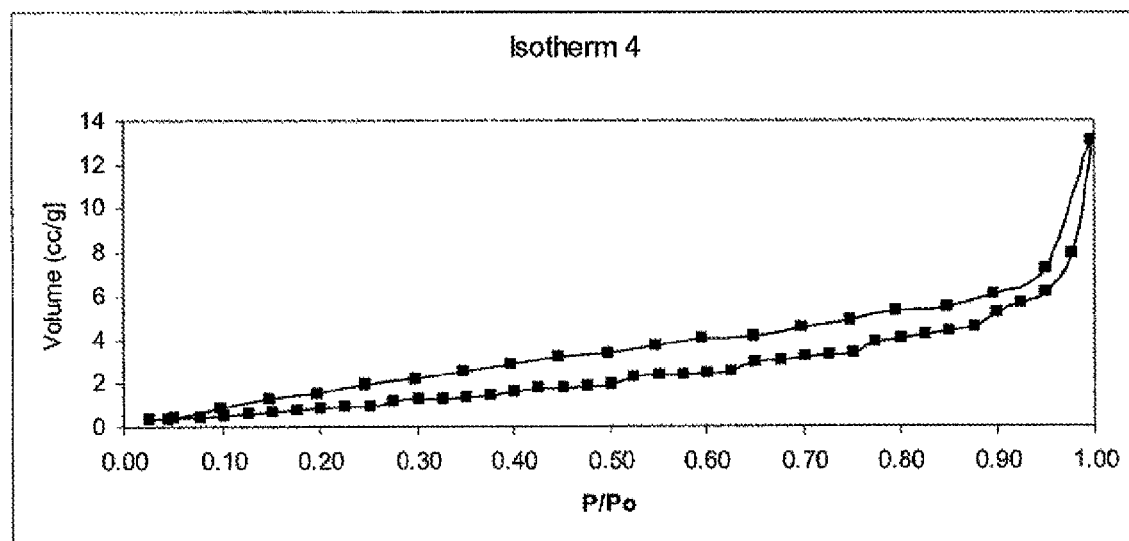
FIG. 15. Adsorption-desorption isotherm of sample #4, PNC-EP char, Eprida peanut hull.
Figure 16:
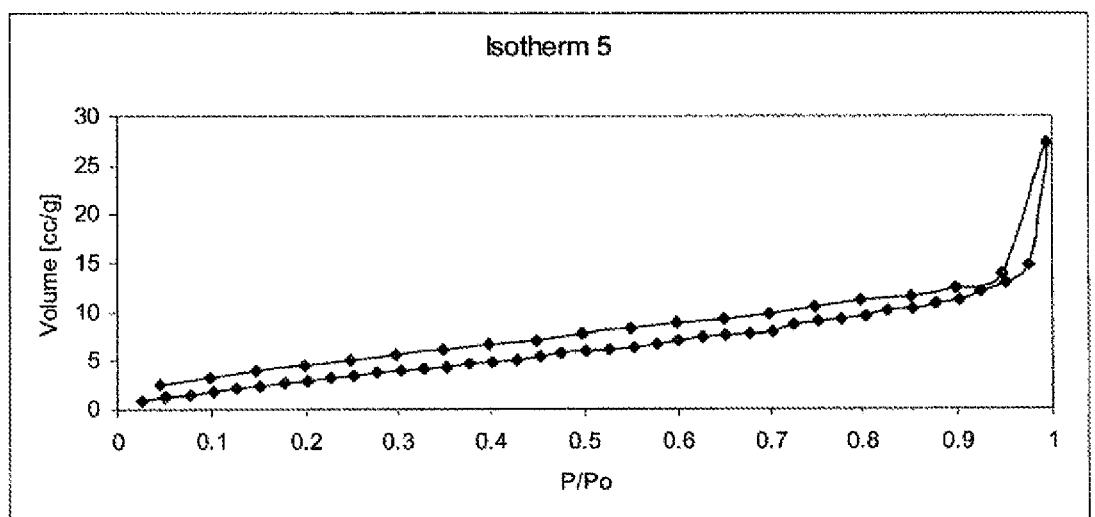
FIG. 16. Adsorption-desorption isotherm of sample #5, PNC-M char, Eprida peanut hull.
Figure 17:
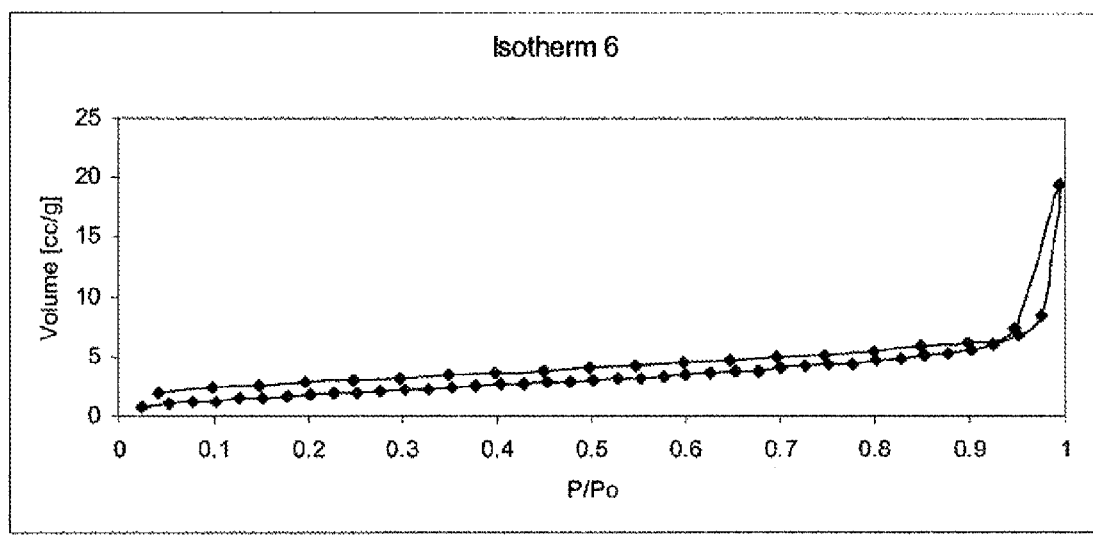
FIG. 17. Adsorption-desorption isotherm of sample #6, PNC-B char, Eprida peanut hull.
Figure 18:
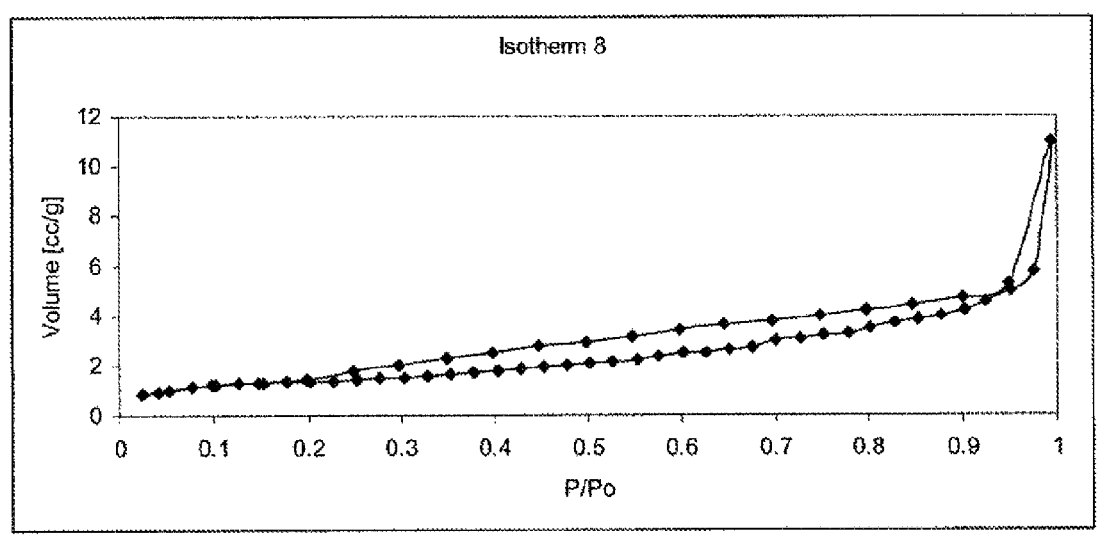
FIG. 18. Adsorption-desorption isotherm of sample #8, PIC-EP char, Eprida southern yellow pine.
Figure 19:
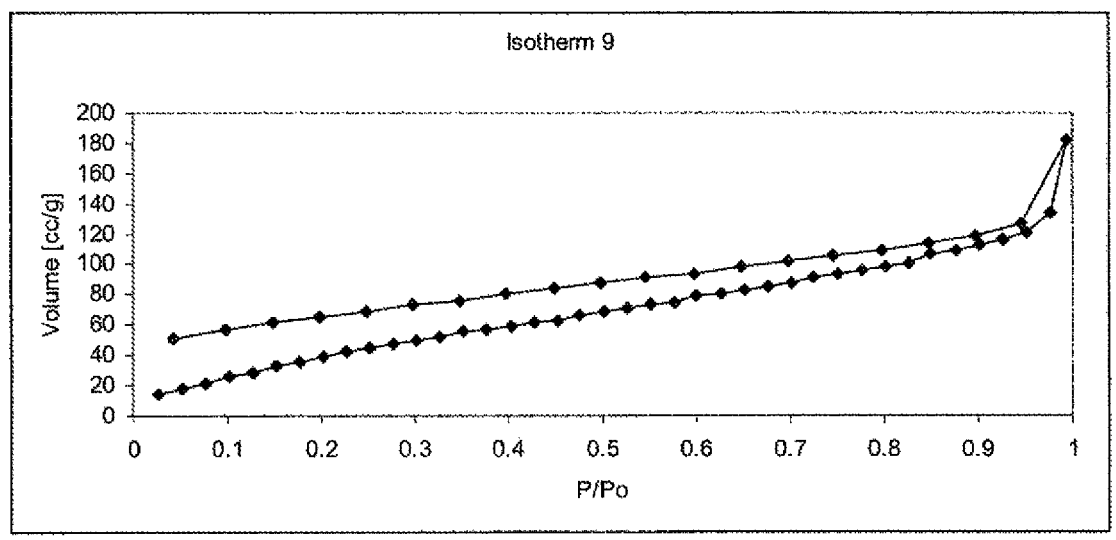
FIG. 19. Adsorption-desorption isotherm of sample #9, PIC-M char, Eprida southern yellow pine.
Figure 20:
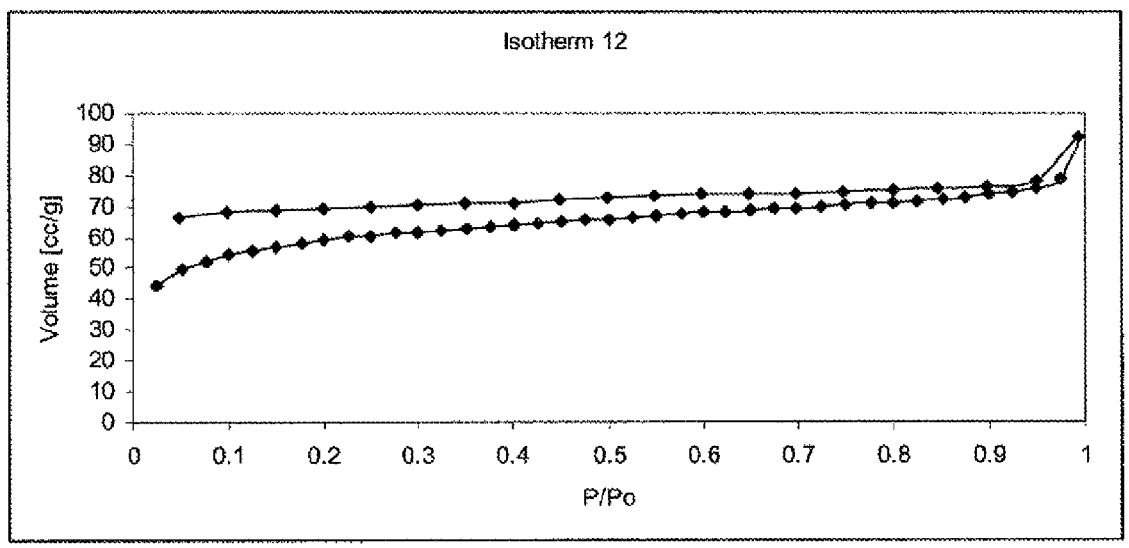
FIG. 20. Adsorption-desorption isotherm of sample #12, "high" char, Eprida peanut hull.
Figure 21:
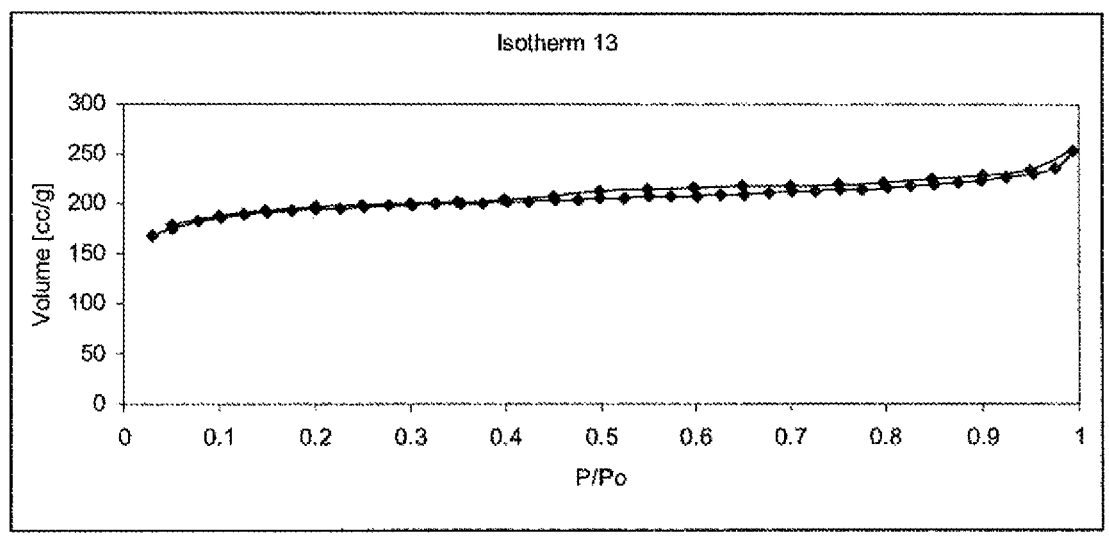
FIG. 21. Adsorption-desorption isotherm of sample #13, "active" char, Eprida peanut hull.
Figure 22:
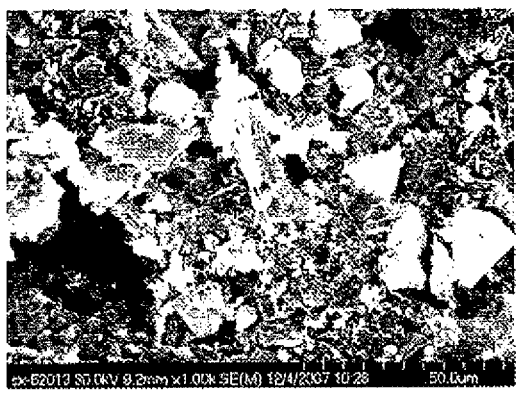
FIG. 22. SEM micrographs of sample #1 adhered to silicon wafer with isopropanol (IPA). Top left 50 μm, bottom left 50 μm, top right 10 μm, bottom right 10 μm.
Figure 22:
Figure 22:
Figure 22:
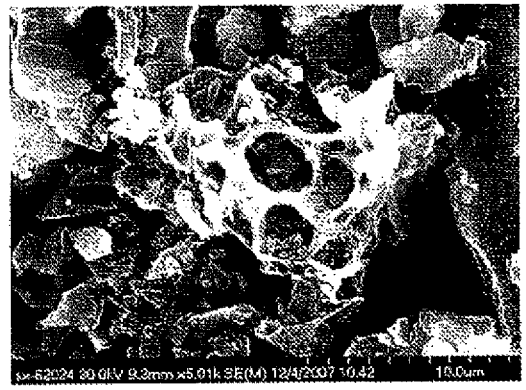
Figure 23:
FIG. 23. SEM micrographs of sample #1 adhered to silicon wafer with water. Top left 50 μm, bottom left 50 μm, top right 5 μm, bottom right 10 μm.
Figure 23:
Figure 23:
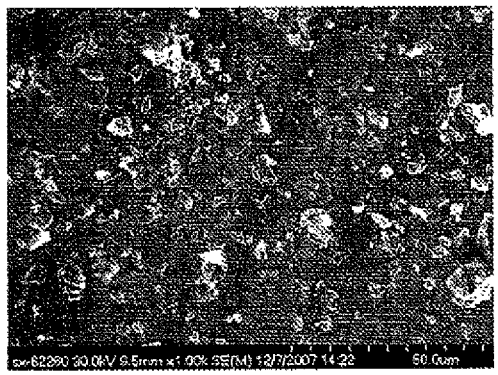
Figure 23:
Figure 24:
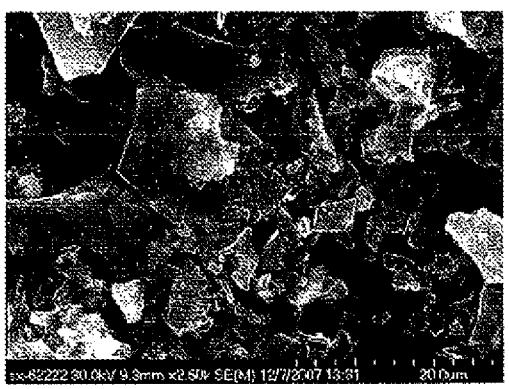
FIG. 24. SEM micrographs of sample #1 adhered to silicon wafer with IPA. Top left 20 μm, bottom left 20 μm, top right 5 μm, bottom right 300 nm.
Figure 24:
Figure 24:
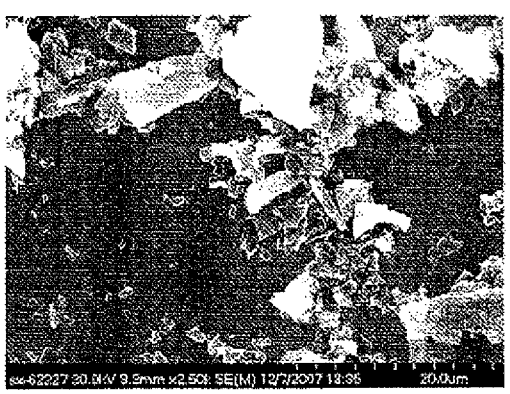
Figure 24:
Figure 25:
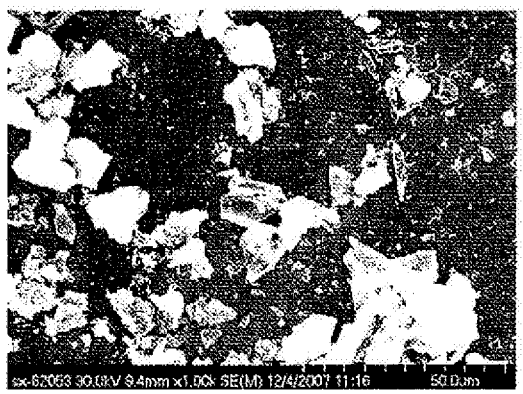
FIG. 25. SEM micrographs of sample #1 adhered to silicon wafer with water. Top left bottom left 20 top right 5 μm, bottom right 2 μm.
Figure 25:
Figure 25:
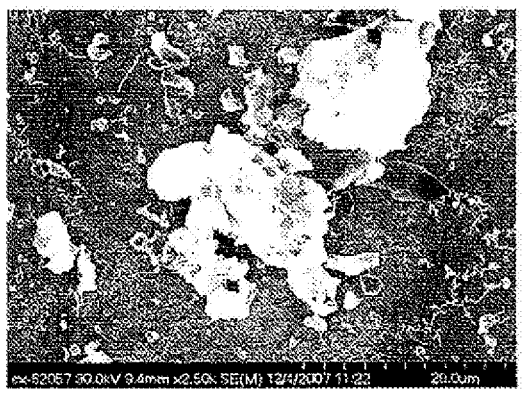
Figure 25:
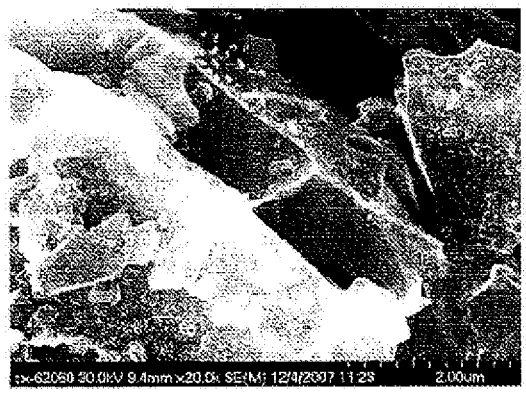
Figure 26:
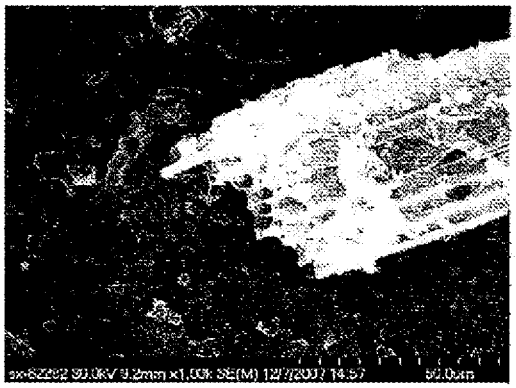
FIG. 26. SEM micrographs of sample #2 adhered to silicon wafer with water. Top left 50 μm, bottom left 10 μm, top right 20 μm, bottom right 5 μm.
Figure 26:
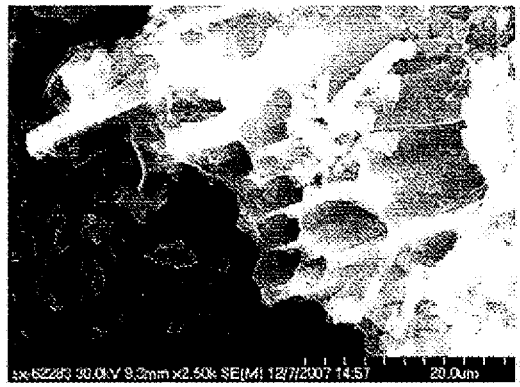
Figure 26:
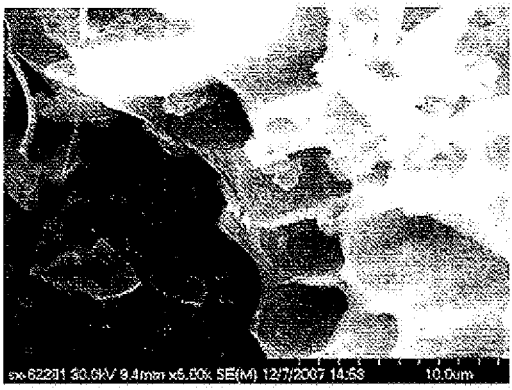
Figure 26:
Figure 27:
FIG. 27. SEM micrographs of sample #2 adhered to silicon wafer with IPA. Top left 10 μm, bottom left 50 μm, top right 2 μm, bottom right 5 μm.
Figure 27:
Figure 27:
Figure 27:
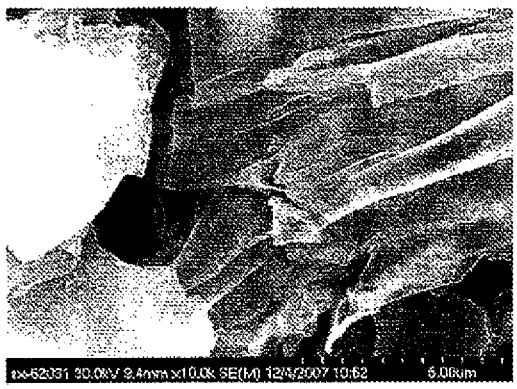
Figure 28:
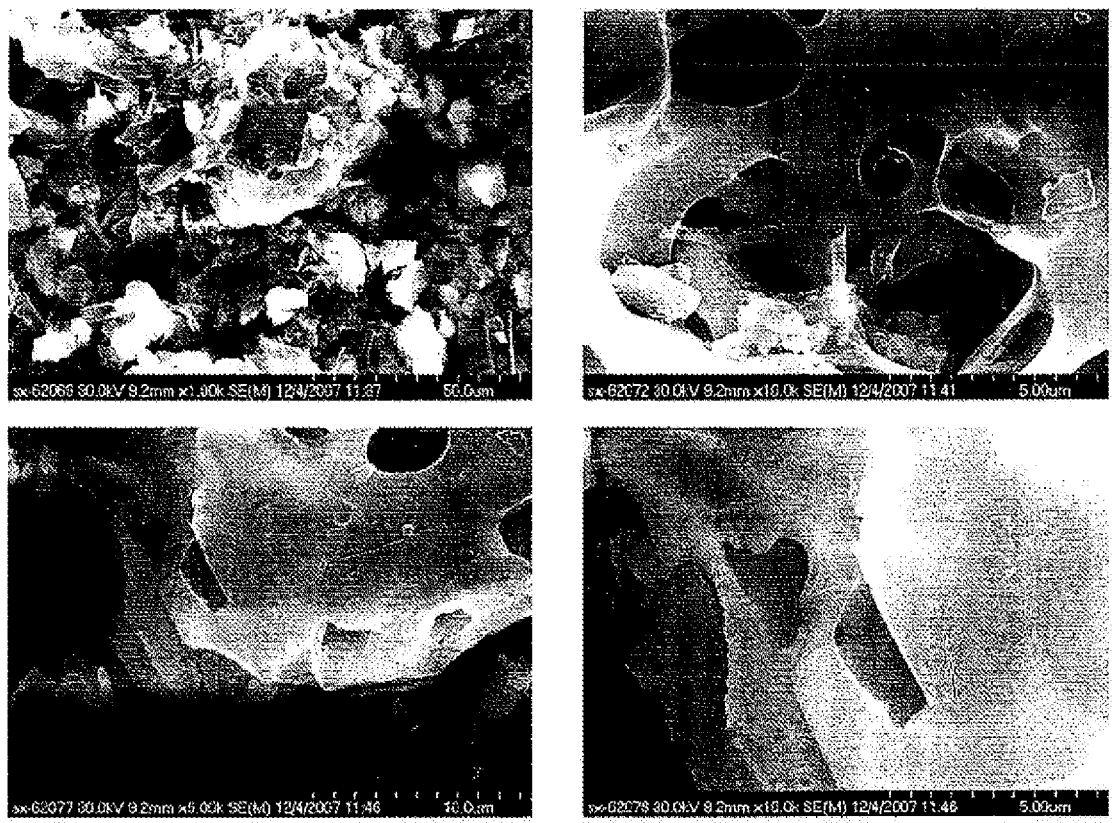
FIG. 28. SEM micrographs of sample #2 adhered to silicon wafer with water. Top left 50 μm, bottom left 10 μm, top right 5 μm, bottom right 5 μm.
Figure 29:
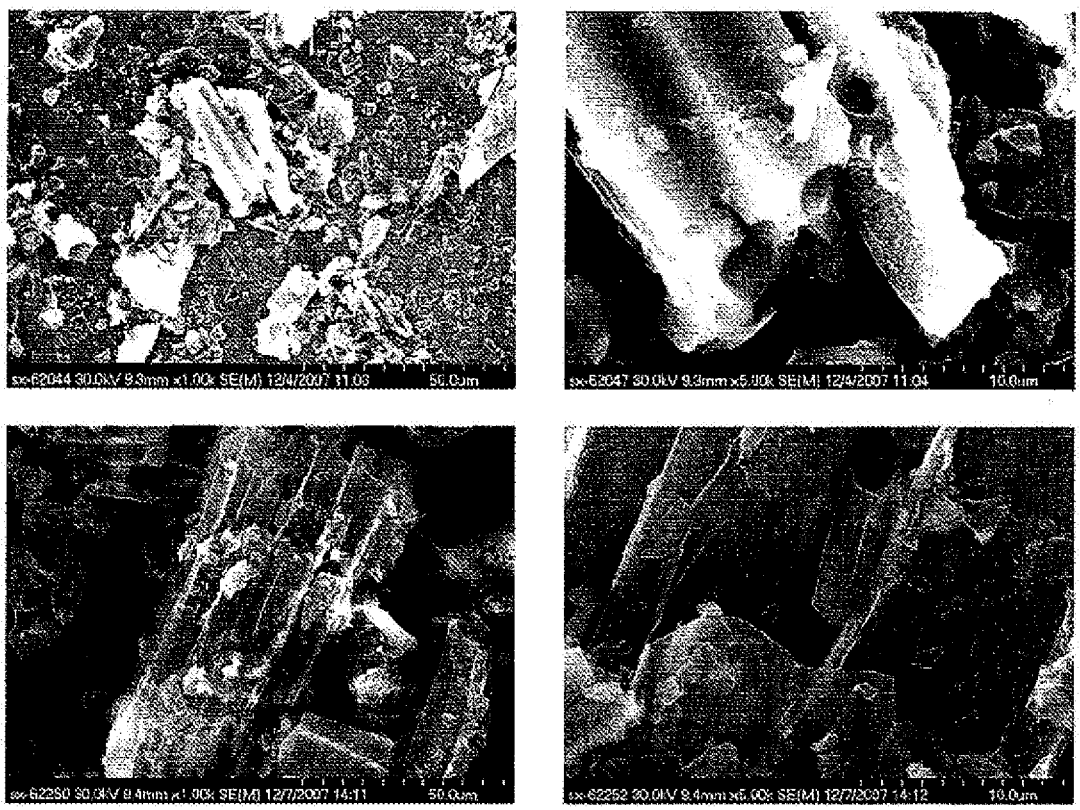
FIG. 29. SEM micrographs of sample #2 adhered to silicon wafer with IPA. Top left bottom left 50 μm, top right 10 μm, bottom right 10 μm.

In FIGS. 8 and 9, it is seen that samples 4, 5 and 6 of the Eprida peanut hull carry many distinct characteristic OH and C=O frequencies, similar to that of sample 1 and 2 comstovers, as does samples 8 and 9 of the southern yellow pine. In FIG. 10, the FTIR of samples 12 and 13 loose their characteristic OH (3500 cm-1) and CH peaks (several peak intensities missing between 1700-800 cm$^{-1}$).

Qualitatively, it appears that in sample 1 the C—O and O—H (3500 cm$^{-1}$) decrease in intensity as compared to sample 2, which can be related to some of the elemental analysis and surface analysis discussed below. As one might expect, at higher pyrolytic temperatures, more of the organic composition is burned away, thus leading to lower absorbance of organic moieties.

Example 5

Elemental Analysis and Results

Tables 5 and 6 below show, respectively, elemental and proximate analysis of selected oxygenated biochar samples prepared according to the method of the invention. The analyses were conducted as average percentages of two analyses, with the exception of % loss on drying, which is from a one time analysis. The standard deviation is less than 10%.

TABLE 5

Elemental Analysis of Selected Biochars

| Sample | % C | % H | % N | % O | % S | O:C Wt % | O:C mol |
|---|---|---|---|---|---|---|---|
| JL#1 | 54.6 ± 4.0 0.045 mol | 1.81 ± 0.2 | 1.02 ± 0.06 | 9.14 ± 0.6 0.0057 mol | <0.3 | 0.167:1 | 0.13:1 |
| JL#2 | 38.5 ± 0.3 0.032 mol | 1.94 ± 0.02 | 0.81 ± 0.06 | 12.1 ± 0.54 0.0076 mol | <0.3 | 0.314:1 | 0.24:1 |

Comparison of samples 1 and 2 show that both have very high ash content (>58%), similar fixed carbon, and % C. There is 1.7× more volatile matter in sample 2 (450° C.), which correlates with the lower pyrolytic temperature. There is also consistently a higher % O in sample 2 (1.7×), which relates to a higher O:C mole ratio, almost twice as much as sample 1. This also correlates to the FTIR spectra in FIG. 7, where the OH and C=O intensities are higher for sample 2 when the spectra are normalized. Interestingly, the CEC values are also consistently higher up to a factor of 2 (sample 2=26.4 [cmol(+)kg$^{-1}$], sample 1=10.28 [cmol(+)kg$^{-1}$]) for sample 2.

Comparison of samples 4, 5, and 6 show that there is a higher O:C ratio for 6. FTIR analysis also shows that there is also qualitatively stronger C=O and OH absorbance than that of 5. It is also interesting to note that the CEC value for 6 is significantly larger (60.1 [cmol (+)/kg], than for 4 and 5 (12.4, and 6.2 [cmol (+)/kg], respectively).

Samples 12 and 13 show similar ash content. Sample 13 has a slightly higher % volatile matter (8.86% vs. 6.15) than 12, but a lower calculated fixed carbon (67.8 vs. 75.1). However, despite the fact that the % C of 12 and 13 are very similar, 13 has a significant amount of more % O, which calculates to a factor of 1.7× more O:C ratio for 13 than 12. This correlates again with the CEC ratio, where 13 has a significantly higher CEC of 66.6 cmol (+)/kg and sample 12 ca. 12.0 cmol (+)/kg. In addition, sample 13 has a larger surface area, ca. 3.3 times that of 12, see below.

Samples 8 and 9, southern yellow pine, have similar values in all the elemental and proximate analyses, with only the % ash being slightly higher for 8, but the resultant O:C ratio for

TABLE 6

Proximate Analysis of Selected Biochars

| Sample | % Loss on Drying | % Volatile Matter @ 950° C. | % Ash | % Fixed Carbon (by difference) | C % (mol %) | H % (mol %) | % N (mol %) | O % (mol %) | S % (mol %) | O:C (mol ratio) |
|---|---|---|---|---|---|---|---|---|---|---|
| JL#1 (grind) | 2.16 | 7.59 | 58.76 | 32.57 | 33.46 (0.028) | 1.04 (0.010) |  | 5.13 (0.003) |  | 0.114:1 |
| JL#2 (grind) | 2.30 | 12.71 | 58.02 | 28.66 | 33.21 (0.028) | 1.38 (0.014) |  | 8.60 (0.005) |  | 0.192:1 |
| JL#4 (grind) | 5.86 | 23.13 | 7.57 | 65.54 | 71.54 (0.060) | 2.90 (0.03) | 2.08 | 16.59 (0.010) | 0.106 | 0.167:1 |
| JL#5 (grind) | 6.30 | 22.25 | 7.51 | 67.08 | 72.33 (0.060) | 2.80 (0.028) | 1.92 | 15.00 (0.0094) | 0.108 | 0.156:1 |
| JL#6 (grind) | 13.31 | 25.78 | 7.16 | 60.41 | 68.26 (0.057) | 2.76 (0.028) | 1.97 | 19.88 (0.012) | 660 ppm | 0.218:1 |
| JL#8 (grind) | 4.54 | 22.60 | 7.54 | 67.60 | 74.78 (0.062) | 3.19 | <0.5 | 14.99 (0.0094) | <0.09 | 0.151:1 |
| JL#9 (grind) | 5.37 | 22.55 | 4.50 | 70.27 | 76.59 (0.0638) | 2.97 | <0.5 | 15.42 (0.0096) | <0.08 | 0.151:1 |
| JL#12 (grind) | 8.14 | 6.15 | 14.66 | 75.12 | 74.94 (0.062) | 0.84 (0.084) | 0.95 | 7.45 (0.0047) | 0.16 | 0.075:1 |
| JL#13 (grind) | 19.58 | 8.86 | 13.60 | 67.76 | 72.68 (0.061) | 0.71 (0.071) | 0.53 | 12.61 (0.0079) | 0.17 | 0.129:1 |

As evidenced by the data in Tables 5 and 6, overall, cornstover samples 1 and 2 have a higher ash content (58%) than all the peanut hull and southern yellow pine samples 4, 5, 6, 8, 9, 12, 13 (4.5-14.6%), but have the lowest % C (ca. 33% (1 and 2) vs. ca. 73% (4-6, 8-9 and 12-13) and % O (5-8.6% (1 and 2) vs. ca. 12-20% (4-6, 8-9 and 13), with exception of sample 12 at 7.5%. See Tables 5 and 6 below. It is also notable that southern yellow pine has very little nitrogen (<0.5%), whereas the peanut hulls and cornstover have 0.5-2.0% nitrogen.

both samples are 0.15:1. It is notable that the CEC values for 8 and 9 are similar, with a negative CEC of ca. −(4.7 to 3.8).

It appears that the CEC values correlate well with the O:C ratios of the samples. Generally, it has been found that the higher the O:C ratio, the higher the CEC value. Although sample 13 does not have as high of an O:C ratio as samples 6 or 2, the increase in surface area may play a role in the increased CEC value. SEM spectra also correlate well with the surface areas for samples 1 and 2, showing pore size distribution in sample 2.

Example 6

Surface Area Analysis and Results

BET specific surface areas were obtained from nitrogen adsorption-desorption isotherms measured at 77K on a Quantachrome Autosorb-1 analyzer with all samples outgassed at 200° C. prior to analysis for a minimum of 8 hours. Pore size distributions were analyzed by the BJH method, and BET taken from a multipoint plot over a P/Po range 0.05-0.35.

For BET analysis, all samples were outgassed a minimum of 8 hours at 200° C. Referring to FIGS. 11-21, in general, the isotherms exhibit Type I characteristics, which indicate microporous solids having relatively small external surfaces. For all samples excluding 9, 12 and 13, surface areas were between 4-57 $m^2/g$ for ground samples. It was observed that sieving appears to increase the surface area for sample 1 and 2. The limiting uptake of adsorbate is governed by the accessible micropore volume rather than the internal surface area. However, some hysteresis is observed in samples, and this indicates bottle-neck or slit-shaped pores. In some cases, the desorption branch closes at very low P/Po, but sometimes it does not, which is likely an effect of the micropores unable to desorb the nitrogen at high pressure. There is also no distinct curvature at low relative pressure (P/Po), or central linear section of the isotherm, and this indicates a strong adsorbate-adsorbate ($N_2$—$N_2$ gas) interaction rather than adsorbate-adsorbent ($N_2$-substrate). All of the isotherms, except 13, do not close before reaching a relative pressure of <0.3 in the desorption process, thus indicating that microporosity is present. Sample 2 (grind) shows a distribution of pore sizes between 1.5-5.0 nm.

BET surface area of ground samples 1 are consistently higher than that of sample 2. This also correlates with the SEM images (as discussed below) where the pore wall structure, or "tubules" are seen to remain intact for sample 2, whereas sample 1 shows irregular, undefined structure with large open areas, allowing for more porosity and surface area.

Surprisingly, samples 12 and 13 have very large surface areas, and sample 13 exhibits a near closed loop hysteresis above 0.3 P/Po, indicating possible "ink bottle" pores, but pore analysis indicates that the micropores are <1.5 nm in diameter.

Example 7

Scanning Electron Microscope (SEM) Analysis and Results

SEM images were taken on a Hitachi S-4700. Samples were mixed in water or isopropanaol (IPA) at 5 wt % then placed on top of a 500 μm p-doped silicon wafer (which has very low resistance, i.e., <0.005 ohm-cm) and dried to fix the char samples onto the wafer.

SEM images of sample 1 are shown in FIGS. 22-25. As shown by the micrographs of FIGS. 22-25, most of the cell walls of sample 1 are obliterated, and no appreciable pore structure is left. SEM images of sample 2 are shown in FIGS. 26-29. As shown by the micrographs of FIGS. 26-29, tubules are shown to remain intact, which correlates well that a large pore size distribution is seen in the gas sorption method above. The micrographs are labeled with the solvent (i.e., IPA or water), used to suspend the samples for transfer and spreading on the SEM grids. On the bottom of each micrograph is a length scale of the indicated length (e.g., in microns (μm) or nanometers (nm)) along with scale lines dividing the indicated length.

While there have been shown and described what are at present considered the preferred embodiments of the invention, those skilled in the art may make various changes and modifications which remain within the scope of the invention defined by the appended claims.

What is claimed is:

1. An oxygenated biochar composition possessing an oxygen-to-carbon molar ratio of at least 0.3:1.

2. The oxygenated biochar composition of claim 1, wherein the oxygenated biochar is enriched in nitrogen-containing fertilizing compounds.

3. A soil formulation containing as a component therein soil admixed with the oxygenated biochar composition of claim 1.

4. An oxygenated biochar composition possessing a cation exchange capacity of at least 140 mmol/kg.

5. The oxygenated biochar composition of claim 4, wherein the oxygenated biochar possesses a cation exchange capacity of at least 300 mmol/kg.

6. The oxygenated biochar composition of claim 4, wherein the oxygenated biochar possesses a cation exchange capacity of at least 500 mmol/kg.

7. The oxygenated biochar composition of claim 4, wherein the oxygenated biochar is enriched in nitrogen-containing fertilizing compounds.

8. A soil formulation containing as a component therein soil admixed with the oxygenated biochar composition of claim 4.

9. The oxygenated biochar of claim 4, wherein said oxygenated biochar composition has a substantial concentration of oxygen-containing groups selected from the group consisting of hydroxy and carboxy groups.

10. The oxygenated biochar of claim 9, wherein said oxygen-containing groups comprise phenolic and carboxylic acid groups.

11. The oxygenated biochar of claim 9, wherein said oxygenated biochar composition possesses an oxygen-to-carbon molar ratio of at least 0.1:1.

12. The oxygenated biochar of claim 9, wherein said oxygenated biochar composition possesses an oxygen-to-carbon molar ratio of at least 0.3:1.

13. A method for producing an oxygenated biochar material possessing a cation-exchanging property, the method comprising reacting a biochar source under mixing conditions with at least one oxygenating compound under incomplete combustion conditions, wherein the method produces an oxygenated biochar having an oxygen-to-carbon molar ratio of at least 0.3:1 or a cation exchange capacity of at least 140 mmol/kg and a homogeneous distribution of oxygen-containing cation-exchanging groups.

14. The method of claim 13, wherein said at least one oxygenating compound is oxygen gas.

15. The method of claim 13, wherein the oxygen-containing cation-exchanging groups are hydroxy groups, carboxy groups, or a combination thereof.

16. The method of claim 13, wherein reacting biochar with the at least one oxygenating compound is effected by treating the biochar with an oxygen-plasma process.

17. The method of claim 13, wherein said reacting of biochar with the at least one oxygenating compound is conducted at a temperature and for a period of time effective for functionalizing the biochar source with said oxygen-containing cation-exchanging groups in an incomplete combustion process.

18. The method of claim 17, wherein said reacting of biochar is conducted by performing the reaction in a closed container containing said biochar and an amount of oxygenating compound less than the amount required for complete combustion of said biochar.

19. The method of claim 17, wherein said reacting of biochar is conducted by rapid quenching of the reaction before complete oxidation can take place.

20. The method of claim 19, wherein the reaction is quenched by contacting the reacting biochar with water.

21. The method of claim 19, wherein the reaction is quenched by covering the reacting biochar with an inert substance.

22. The method of claim 13, wherein said method is integrated in a biomass-to-biofuel process.

23. The method of claim 13, wherein no more than 10% by weight of the carbon contained in the biochar source is converted to one or more oxide gases of combustion.

24. The method of claim 13, wherein no more than 5% by weight of the carbon contained in the biochar source is converted to one or more oxide gases of combustion.

25. The method of claim 13, wherein no more than 2% by weight of the carbon contained in the biochar source is converted to one or more oxide gases of combustion.

26. The method of claim 13, wherein no more than 1% by weight of the carbon contained in the biochar source is converted to one or more oxide gases of combustion.

27. The method of claim 13, wherein the oxygenated biochar possesses a cation exchange capacity of at least 300 mmol/kg.

28. The method of claim 13, wherein the oxygenated biochar possesses a cation exchange capacity of at least 500 mmol/kg.

29. An oxygenated biochar composition produced by the method of claim 13, wherein the oxygenated biochar possesses an oxygen-to-carbon molar ratio of at least 0.3:1.

30. An oxygenated biochar composition produced by the method of claim 13, wherein the oxygenated biochar possesses a cation exchange capacity of at least 140 mmol/kg.

* * * * *